United States Patent
Nishizawa

(10) Patent No.: US 10,657,722 B2
(45) Date of Patent: May 19, 2020

(54) TRANSMISSIVE DISPLAY DEVICE, DISPLAY CONTROL METHOD, AND COMPUTER PROGRAM

(71) Applicant: SEIKO EPSON CORPORATION, Tokyo (JP)

(72) Inventor: Kazuo Nishizawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 8 days.

(21) Appl. No.: 15/918,407

(22) Filed: Mar. 12, 2018

(65) Prior Publication Data

US 2018/0276898 A1    Sep. 27, 2018

(30) Foreign Application Priority Data

Mar. 22, 2017    (JP) ................................ 2017-055713

(51) Int. Cl.
*G06T 19/00* (2011.01)
*G06T 7/90* (2017.01)
*G06T 7/13* (2017.01)
*G06F 3/0481* (2013.01)
*G02B 27/01* (2006.01)
(Continued)

(52) U.S. Cl.
CPC ........ *G06T 19/006* (2013.01); *G02B 27/0093* (2013.01); *G02B 27/0172* (2013.01); *G06F 3/011* (2013.01); *G06F 3/04812* (2013.01); *G06T 7/13* (2017.01); *G06T 7/90* (2017.01); *G02B 2027/014* (2013.01); *G02B 2027/0118* (2013.01); *G02B 2027/0138* (2013.01); *G02B 2027/0178* (2013.01); *G02B 2027/0187* (2013.01)

(58) Field of Classification Search
None
See application file for complete search history.

(56) References Cited

U.S. PATENT DOCUMENTS 9,551,870 B2    1/2017 Baba
2007/0040993 A1*  2/2007 Yokoyama ............. G03B 21/26
                                                353/42
(Continued)

FOREIGN PATENT DOCUMENTS

JP    2001-034386 A    2/2001
JP    2015-023381 A    2/2015
(Continued)

*Primary Examiner* — Michelle Chin
(74) *Attorney, Agent, or Firm* — Oliff PLC

(57) ABSTRACT

A transmissive display device includes a display section having a light transmissive property, and adapted to display a target image as a display target and a pointer image so as to be superimposed on an external world visually recognized through the display section, a display control section adapted to control a display configuration of the pointer image, and an imaging section adapted to take an image of the external world, and the display control section sets either one of an external world image obtained by the imaging, the target image, and a composite image of the external world image and the target image as a reference image, and displays the pointer image with the display configuration changed in accordance with a feature quantity of an area including a display position of the pointer image in the reference image.

9 Claims, 17 Drawing Sheets

(51) Int. Cl.
*G06F 3/01* (2006.01)
*G02B 27/00* (2006.01)

(56) References Cited

U.S. PATENT DOCUMENTS

| | | | | |
|---|---|---|---|---|
| 2007/0206024 A1* | 9/2007 | Rao | ............... | G06F 3/0481 |
| | | | | 345/593 |
| 2010/0225617 A1* | 9/2010 | Yoshimoto | ............... | G06F 3/042 |
| | | | | 345/175 |
| 2012/0069159 A1* | 3/2012 | Matsui | ............... | G06F 3/04815 |
| | | | | 348/51 |
| 2013/0335435 A1* | 12/2013 | Ambrus | ............... | G06T 19/20 |
| | | | | 345/589 |
| 2017/0243406 A1 | 8/2017 | Yamazaki | | |

FOREIGN PATENT DOCUMENTS

| | | |
|---|---|---|
| JP | 2016-081209 A | 5/2016 |
| JP | 2016-142988 A | 8/2016 |

\* cited by examiner

COLOR OF AVERAGE HUE VALUE OF OVERLAPPING AREA Ar1

COLOR OF POINTER IMAGE Pt
(COMPLEMENTARY COLOR TO AVERAGE HUE VALUE
OF OVERLAPPING AREA Ar1)

|▥| EDGE INCLINATION Edg1 OF EXTERNAL WORLD IMAGE
|▤| EDGE INCLINATION Edg2 OF TARGET IMAGE AI
|▨| PATTERN OF POINTER IMAGE Pt

TRANSMISSIVE DISPLAY DEVICE, DISPLAY CONTROL METHOD, AND COMPUTER PROGRAM

BACKGROUND

1. Technical Field

The present invention relates to a transmissive display device.

2. Related Art

As a head-mounted display device (head mounted display (HMD)) which is mounted on the head of a user to display an image or the like in the visual field area of the user, there is known a transmissive head-mounted display device with which the external landscape can visually be recognized in a see-through manner together with the image when mounted. The head-mounted display device generates image light representing an image using, for example, a liquid crystal display and a light source, and then guides the image light thus generated to the eyes of the user using a projection optical system, a light guide plate, and so on to thereby make the user recognize a virtual image. The user operates a pointer such as a mouse cursor displayed on the liquid crystal display to thereby control the head-mounted display device. However, depending on the color, the texture, and so on in the external landscape and the display image, the pointer is hard to visually recognize, and the visual contact with the pointer is lost in some cases. In JP-A-2016-142988 (Document 1), there is disclosed a technology of calculating the display luminance of the display image based on the luminance of the overall external landscape image and the luminance of the overall display image to control the color or the color density for displaying the display image in accordance with the display luminance when displaying the display image so as to be superimposed on the external landscape image in a transmissive display device.

However, in the technology described in Document 1, the color of the external landscape affects the color of the pointer in, for example, the case in which the luminance of the display image is remarkably low compared to the luminance of the external landscape, and the case in which the display image is visually recognized through the colorful external landscape, and there can occur a problem that it is impossible or difficult for the user to visually recognize the pointer. Such a problem is not limited to the transmissive head-mounted display device, but is also common to a transmissive display device for displaying an image and so on so as to be superimposed on the external landscape. Therefore, in such a transmissive display device, there is desired a technology for improving the visibility of the pointer.

SUMMARY

An advantage of some aspects of the invention is to solve at least a part of the problem described above, and the invention can be implemented as the following aspects.

(1) According to an aspect of the invention, a transmissive display device is provided. The transmissive display device includes a display section having a light transmissive property, and adapted to display a target image as a display target and a pointer image so as to be superimposed on an external world visually recognized through the display section, a display control section adapted to control a display configuration of the pointer image, and an imaging section adapted to take an image of the external world, and the display control section sets either one of an external world image obtained by the imaging, the target image, and a composite image of the external world image and the target image as a reference image, and displays the pointer image with the display configuration changed in accordance with a feature quantity of an area including a display position of the pointer image in the reference image.

According to the transmissive display device of this aspect, since either one of the external world image obtained by the imaging, the target image, and the composite image of the external world image and the target image is set as a reference image, and the pointer image is displayed with the display configuration changed in accordance with the feature quantity of the area including the display position of the pointer image in the reference image, it is possible to display the pointer image with the display configuration taking the feature of the reference image into consideration, and the visibility of the pointer image can be improved.

(2) In the transmissive display device of the aspect, the reference image may be the composite image. According to the transmissive display device of the aspect with this configuration, since the reference image is the composite image, it is possible to control the display configuration of the pointer image taking the feature quantity of the external world image and the target image into consideration. Therefore, in the case in which the target image is displayed so as to be superimposed on the external world visually recognized in a see-through manner, and the pointer image is further displayed in a superimposed manner, the visibility of the pointer image can be improved.

(3) In the transmissive display device of the aspect, the transmissive display device may further include an average hue value calculation section adapted to calculate an average hue value of an area including the display position of the pointer image in the reference image, and the display control section may display the pointer image with a color of the pointer image set to a complementary color to the average hue value. According to the transmissive display device of the aspect with this configuration, since the pointer image is displayed with the color changed to the complementary color to the average hue value, it is possible to make the pointer image easier to visually recognize compared to the configuration in which the color of the pointer image is not the complementary color to the average hue value.

(4) In the transmissive display device of the aspect, the transmissive display device may further include an edge inclination calculation section adapted to calculate an edge inclination of an area including the display position of the pointer image in the reference image, and the display control section may set a pattern of the pointer image to a pattern having directionality determined based on the edge inclination, and displays the pointer image. According to the transmissive display device of the aspect with this configuration, since the pointer image is displayed with the pattern changed to the pattern having the directionality determined based on the edge inclination, it is possible to enhance the visibility of the pattern of the pointer image to improve the visibility of the pointer image itself.

(5) In the transmissive display device of the aspect, the display control section may set the pattern to a striped pattern repeated in a direction crossing a resultant vector of the edge inclinations, and display the pointer image. According to the transmissive display device of the aspect with this configuration, since the pointer image is displayed with the pattern changed to the striped pattern repeated in the direction crossing the resultant vector of the edge inclinations, it is possible to enhance the visibility of the striped pattern of the pointer image to improve the visibility of the pointer image itself.

(6) In the transmissive display device of the aspect, the transmissive display device may further include an average hue value calculation section adapted to calculate an average hue value of an area including the display position of the pointer image in the reference image, and the display control section may display the pointer image as a solid with parallax, and set a variation of the parallax based on the average hue value. According to the transmissive display device of the aspect with this configuration, since the pointer image is displayed as a solid with parallax, and the variation of the parallax is set based on the average hue value, it is possible to enhance the visibility of the pointer image to improve the followability (performance of following with eyes) to the pointer image in the case in which the pointer image moves to an area different in average hue value.

(7) In the transmissive display device of the aspect, the transmissive display device may further include an average hue value calculation section adapted to calculate an average hue value of an area including the display position of the pointer image in the reference image, and the display control section may alternately switch a process of displaying the pointer image as a solid with parallax and a process of displaying the pointer image as a plane without parallax, and set a period of providing the parallax based on the average hue value. According to the transmissive display device of the aspect with this configuration, since the process of displaying the pointer image as the solid with parallax and the process of displaying the pointer image as the plane without parallax are alternately switched, and the period of providing the parallax is set based on the average hue value, the pointer image is made conspicuous to enhance the visibility. Further, even in the case in which the pointer image moves to an area different in average hue value, since the period of providing the parallax varies, the pointer image can be made conspicuous, and thus, the followability to the pointer image can be improved.

(8) In the transmissive display device of the aspect, the display control section may display the pointer image as a solid with parallax, and alternately perform a process of moving a focal position of the pointer image displayed as the solid as much as a predetermined length in a direction from the display section toward the external world, and a process of moving the focal position of the pointer image as much as a predetermined length in a direction from the external world toward the display section. According to the transmissive display device of the aspect with this configuration, since the pointer image is displayed as the solid with parallax, and the process of moving the focal position of the pointer image displayed as the solid as much as the predetermined length in the direction from the display section toward the external world and the process of moving the focal position of the pointer image as much as the predetermined length in the direction from the external world toward the display section are performed alternately, it is possible to alternately perform a process of displaying the pointer image having been displayed as the solid in a recessed manner and a process of displaying the pointer image in a protruded manner, and thus, the visibility of the pointer image can further be improved.

(9) In the transmissive display device of the aspect, the display control section may display the pointer image with luminance of at least a part of the pointer image changed periodically. According to the transmissive display device of the aspect with this configuration, since the pointer image is displayed with the luminance of at least a part of the pointer image changed periodically, it is possible to display the pointer image with a part of the pointer image blinked, and thus, the visibility of the pointer image can further be improved.

(10) In the transmissive display device of the aspect, detection of a predetermined operation in the transmissive display device may trigger the display control section to perform control of the display configuration of the pointer image. According to the transmissive display device of the aspect with this configuration, since the control of the display configuration of the pointer image is triggered by the detection of a predetermined operation in the transmissive display device, it is possible for the user of the transmissive display device to control the trigger for execution of the control of the display configuration of the pointer image, and thus, the convenience of the user can be enhanced.

The invention can also be implemented in a variety of configurations. For example, the invention can be implemented as a configuration such as a display control method in the transmissive display device, a computer program for implementing the display control method, and a recording medium storing the computer program.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

A1. Overall Configuration of Transmissive Display Device

Figure 1:
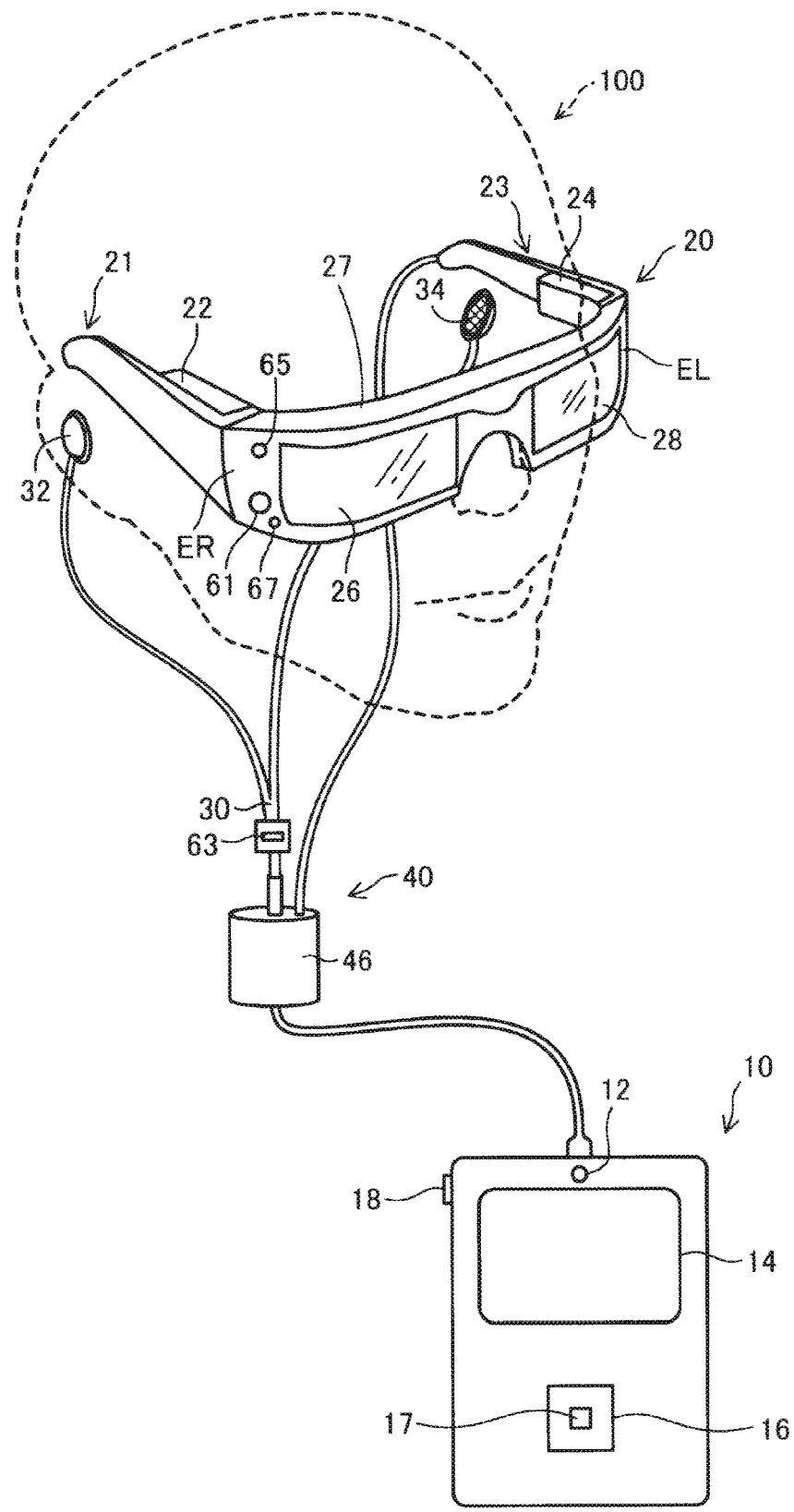
FIG. 1 is an explanatory diagram showing a schematic configuration of a head-mounted display device as a first embodiment of the invention.

FIG. 1 is an explanatory diagram showing a schematic configuration of a head-mounted display device 100 as a first embodiment of the invention. The head-mounted display device 100 is a display device to be mounted on the head of the user, and is also called a head mounted display (HMD). The HMD 100 is a see-through type (transmissive) head-mounted display device in which an image is superimposed on the external world visually recognized through a pair of glasses.

The HMD 100 is provided with an image display section 20 for making the user visually recognize an image, and a control device (a controller) 10 for controlling the image display section 20.

The image display section 20 is a mounted body to be mounted on the head of the user, and is shaped like a pair of glasses in the present embodiment. The image display section 20 is provided with a right display unit 22, a left display unit 24, a right light guide plate 26, and a left light guide plate 28 in a support body having a right holding part 21, a left holding part 23, and a front frame 27. In the present embodiment, the image display section 20 corresponds to a display section in a measure for solving the problem.

The right holding part 21 and the left holding part 23 respectively extend backward from both ends of the front frame 27 to hold the image display section 20 on the head of the user in such a manner as temples of a pair of glasses. Here, out of the both ends of the front frame 27, the end located on the right side of the user in the mounted state of the image display section 20 is defined as an end part ER, and the end located on the left side of the user is defined as an end part EL. The right holding part 21 is disposed so as to extend from the end part ER of the front frame 27 to the position corresponding to the right temporal region of the user in the mounted state of the image display section 20. The left holding part 23 is disposed so as to extend from the end part EL of the front frame 27 to the position corresponding to the left temporal region of the user in the mounted state of the image display section 20.

The right light guide plate 26 and the left light guide plate 28 are provided to the front frame 27. The right light guide plate 26 is located in front of the right eye of the user in the mounted state of the image display section 20, and makes the right eye visually recognize the image. The left light guide plate 28 is located in front of the left eye of the user in the mounted state of the image display section 20, and makes the left eye visually recognize the image.

The front frame 27 has a shape of connecting one end of the right light guide plate 26 and one end of the left light guide plate 28 to each other. The connection position corresponds to a position of the glabella of the user in the mounted state of the image display section 20. The front frame 27 can also be provided with a nose pad having contact with the nose of the user in the mounted state of the image display section 20 at the connection position between the right light guide plate 26 and the left light guide plate 28. In this case, the image display section 20 can be held on the head of the user by the nose pad, the right holding part 21, and the left holding part 23. Further, it is also possible to connect a belt having contact with the head of the user in the mounted state of the image display section 20 to the right holding part 21 and left holding part 23. In this case, it is possible to firmly hold the image display section 20 on the head of the user with the belt.

The right display unit 22 performs the display of the image with the right light guide plate 26. The right display unit 22 is provided to the right holding part 21, and is located in the vicinity of the right temporal region of the user in the mounted state of the image display section 20. The left display unit 24 performs the display of the image with the left light guide plate 28. The left display unit 24 is provided to the left holding part 23, and is located in the vicinity of the left temporal region of the user in the mounted state of the image display section 20.

The right light guide plate 26 and the left light guide plate 28 in the present embodiment are optical parts (e.g., prisms) formed of light transmissive resin or the like, and guide the image light output by the right display unit 22 and the left display unit 24 to the eyes of the user, respectively. It should be noted that it is possible for a dimming plate to be disposed on a surface of each of the right light guide plate 26 and the left light guide plate 28. The dimming plate is an optical element having a thin-plate like shape different in transmittance by the wavelength band of the light, and functions as a so-called wavelength filter. The dimming plate is disposed so as to cover, for example, a surface (a surface on the opposite side to the surface opposed to the eye of the user) of the front frame 27. By arbitrarily selecting the optical characteristic of the dimming plate, it is possible to control the transmittance of the light in an arbitrary wavelength band such as visible light, infrared light, or ultraviolet light, and it is possible to control the light intensity of the outside light having entered the right light guide plate 26 and the left light guide plate 28 from the outside, and then having been transmitted through the right light guide plate 26 and the left light guide plate 28.

The image display section 20 guides the image light generated by the right display unit 22 and the image light generated by the left display unit 24 to the right light guide plate 26 and the left light guide plate 28, respectively, and makes the user visually recognize (this is also called "displays an image") an image (an augmented reality (AR) image) together with the external landscape visually recognized through itself with the image light. In the case in which the outside light is transmitted through the right light guide plate 26 and the left light guide plate 28 from the front of the user and then enters the eyes of the user, the image light constituting the image and the outside light enter the eyes of the user. Therefore, the visibility of the image in the user is affected by the intensity of the outside light.

Therefore, by attaching the dimming plate to, for example, the front frame 27, and arbitrarily selecting or adjusting the optical characteristics of the dimming plate, easiness of visual recognition of the image can be controlled. In a typical example, it is possible to use the dimming plate having such light transmittance that the user wearing the HMD 100 can visually recognize at least the outside scenery. Further, it is possible to improve the visibility of the image by reducing the sunlight. Further, if the dimming plates are used, there can be expected an effect of protecting the right light guide plate 26 and the left light guide plate 28 to suppress damages, adhesion of dirt, and so on to the right light guide plate 26 and the left light guide plate 28, respectively. The dimming plates can be arranged to be detachably attached to the front frame 27, or respectively to the right light guide plate 26 and the left light guide plate 28. Further, it is also possible to arrange that a plurality of types of dimming plates are detachably attached so as to be replaced with each other, or to omit the dimming plates.

The camera 61 is disposed on the front frame 27 of the image display section 20. The camera 61 is disposed at a position where the camera 61 does not block the outside light transmitted through the right light guide plate 26 and the left light guide plate 28 in the front surface of the front frame 27. In the example shown in FIG. 1, the camera 61 is disposed on the end part ER side of the front frame 27. It is also possible for the camera 61 to be disposed on the end part EL side of the front frame 27, or disposed in a connection part between the right light guide plate 26 and the left light guide plate 28.

The camera 61 is a digital camera provided with an imaging element such as CCD or CMOS, an imaging lens, and so on. The camera 61 in the present embodiment is a monocular camera, but it is also possible to adopt a stereo camera. The camera 61 takes an image of at least a part of the external world (a real space) in the obverse side direction of the HMD 100, in other words, in the view direction in which the user performs visual recognition in the mounted state of the image display section 20. In other words, the camera 61 takes an image in the range or the direction overlapping the view of the user, and takes an image in the direction in which the user performs the visual recognition. The width of the field angle of the camera 61 can arbitrarily be set. In the present embodiment, the width of the field angle of the camera 61 is set so as to image the overall view of the user which can be visually recognized by the user through the right light guide plate 26 and the left light guide plate 28. The camera 61 performs imaging in accordance with the control by a control function section 150 (FIG. 6), and then outputs the taken image data thus obtained to the control function section 150. In the present embodiment, the camera 61 corresponds to an imaging section in the measure for solving the problem.

The HMD 100 can also be provided with a distance measuring sensor for detecting the distance to a measurement object located in a predetermined measurement direction. The distance measuring sensor can be disposed in, for example, the connection part between the right light guide plate 26 and the left light guide plate 28 of the front frame 27. The measurement direction of the distance measuring sensor can be set to the obverse side direction (the direction overlapping the imaging direction of the camera 61) of the HMD 100. It is possible for the distance measuring sensor to be constituted by a light emitting section such as an LED or a laser diode, and a light receiving section for receiving the reflected light, namely the light emitted by the light source and then reflected by the measurement object. In this case, the distance is obtained by a triangulation process or a distance measuring process based on the time difference. The distance measuring sensor can also be constituted by, for example, a transmission section for emitting an ultrasonic wave, and a reception section for receiving the ultrasonic wave reflected by the measurement object. In this case, the distance is obtained by a distance measuring process based on the time difference. The distance measuring sensor performs the distance measurement in accordance with an instruction of the control function section 150, and then outputs the detection result to the control function section 150 similarly to the camera 61.

Figure 2:
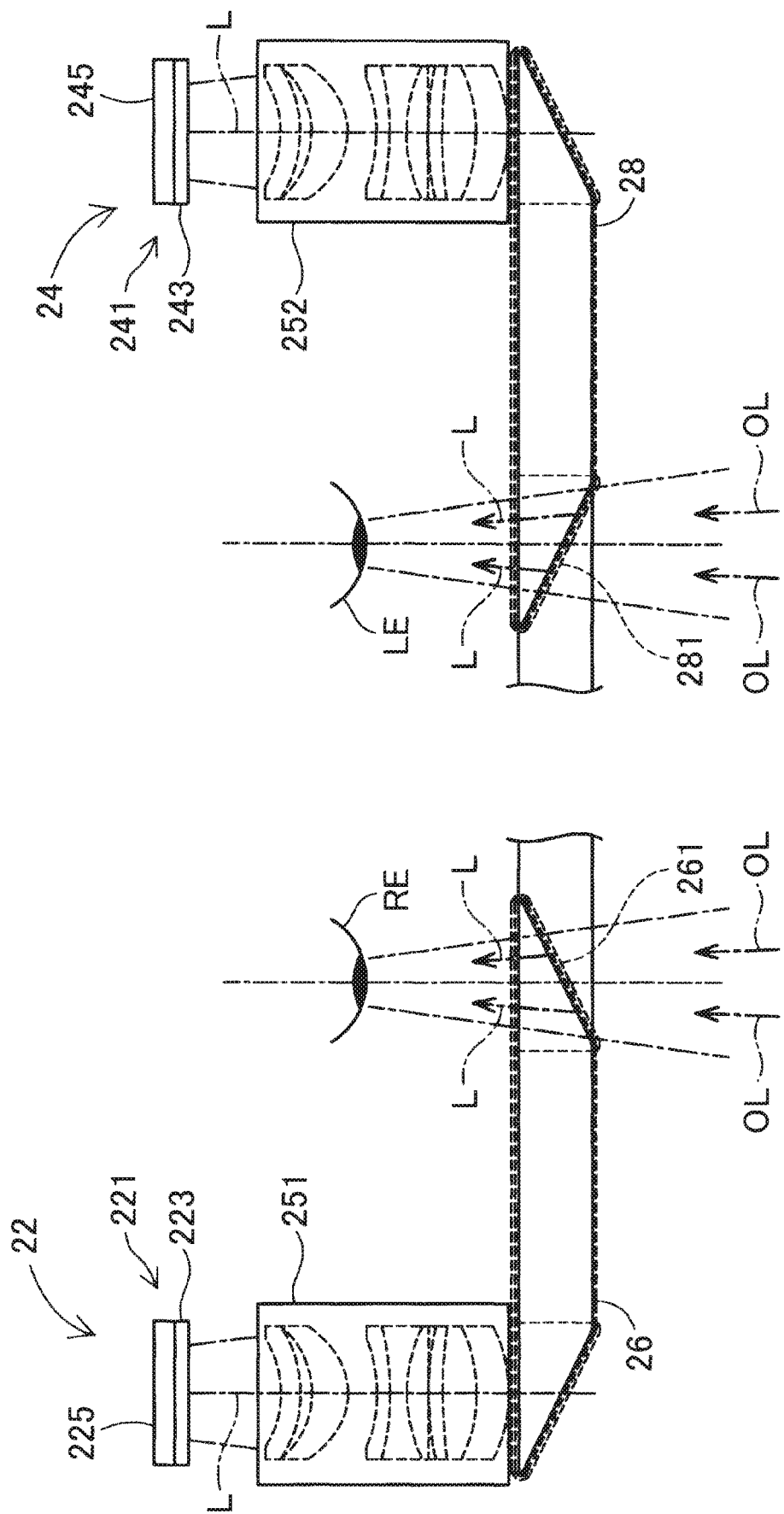
FIG. 2 is a plan view of a substantial part showing a configuration of an optical system provided to an image display section.

FIG. 2 is a plan view of a substantial part showing a configuration of an optical system provided to the image display section 20. For the sake of convenience of explanation, the right eye RE and the left eye LE of the user are illustrated in FIG. 2. As shown in FIG. 2, the right display unit 22 and the left display unit 24 are symmetrically configured.

As a configuration for making the right eye RE visually recognize the image (AR image), the right display unit 22 is provided with an OLED (organic light emitting diode) unit 221 and a right optical system 251. The OLED unit 221 emits the image light. The right optical system 251 is provided with a lens group and so on, and guides the image light L emitted by the OLED unit 221 to the right light guide plate 26.

The OLED unit 221 has an OLED panel 223, and an OLED drive circuit 225 for driving the OLED panel 223. The OLED panel 223 is a light-emitting type display panel constituted by light emitting elements emitting light due to organic electroluminescence to thereby respectively emit R (red) colored light, G (green) colored light, and B (blue) colored light. The OLED panel 223 is provided with a plurality of pixels each including one R element, one G element, and one B element as a unit, and arranged in a matrix.

The OLED drive circuit 225 performs selection and energization of the light emitting elements provided to the OLED panel 223 in accordance with the control by the control function section 150 (FIG. 6) described later to thereby make the light emitting elements emit light. The OLED drive circuit 225 is fixed to the reverse surface of the OLED panel 223, namely the reverse side of the light emitting surface, with bonding or the like. It is also possible for the OLED drive circuit 225 to be formed of, for example, a semiconductor device for driving the OLED panel 223, and to be mounted on a substrate to be fixed to the reverse surface of the OLED panel 223. On this substrate, there is mounted a temperature sensor 217 (FIG. 5) described later. It should be noted that as the OLED panel 223, it is also possible to adopt a configuration in which the light emitting elements each emitting white light are arranged in a matrix, and color filters corresponding respectively to the colors of R, G, and B are disposed so as to overlap the light emitting elements. Further, it is also possible to adopt the OLED panel 223 having a WRGB configuration provided with the light emitting elements for emitting W (white) light in addition to the light emitting elements for respectively radiating the R colored light, the G colored light, and the B colored light.

The right optical system 251 includes a collimating lens for changing the image light L having been emitted from the OLED panel 223 into a light beam in a parallel state. The image light L having been changed by the collimating lens to the light beam in the parallel state enters the right light guide plate 26. In the optical path for guiding the light in the inside of the right light guide plate 26, there is formed a plurality of reflecting surfaces for reflecting the image light L. The image light L is guided to the right eye RE side after a plurality of times of reflection in the inside of the right light guide plate 26. The right light guide plate 26 is provided with a half mirror 261 (a reflecting surface) located in front of the right eye RE. The image light L is reflected by the half mirror 261, and is then emitted from the right light guide plate 26 toward the right eye RE, and then the image light L forms an image on the retina of the right eye RE to make the user visually recognize the image.

Figure 5:
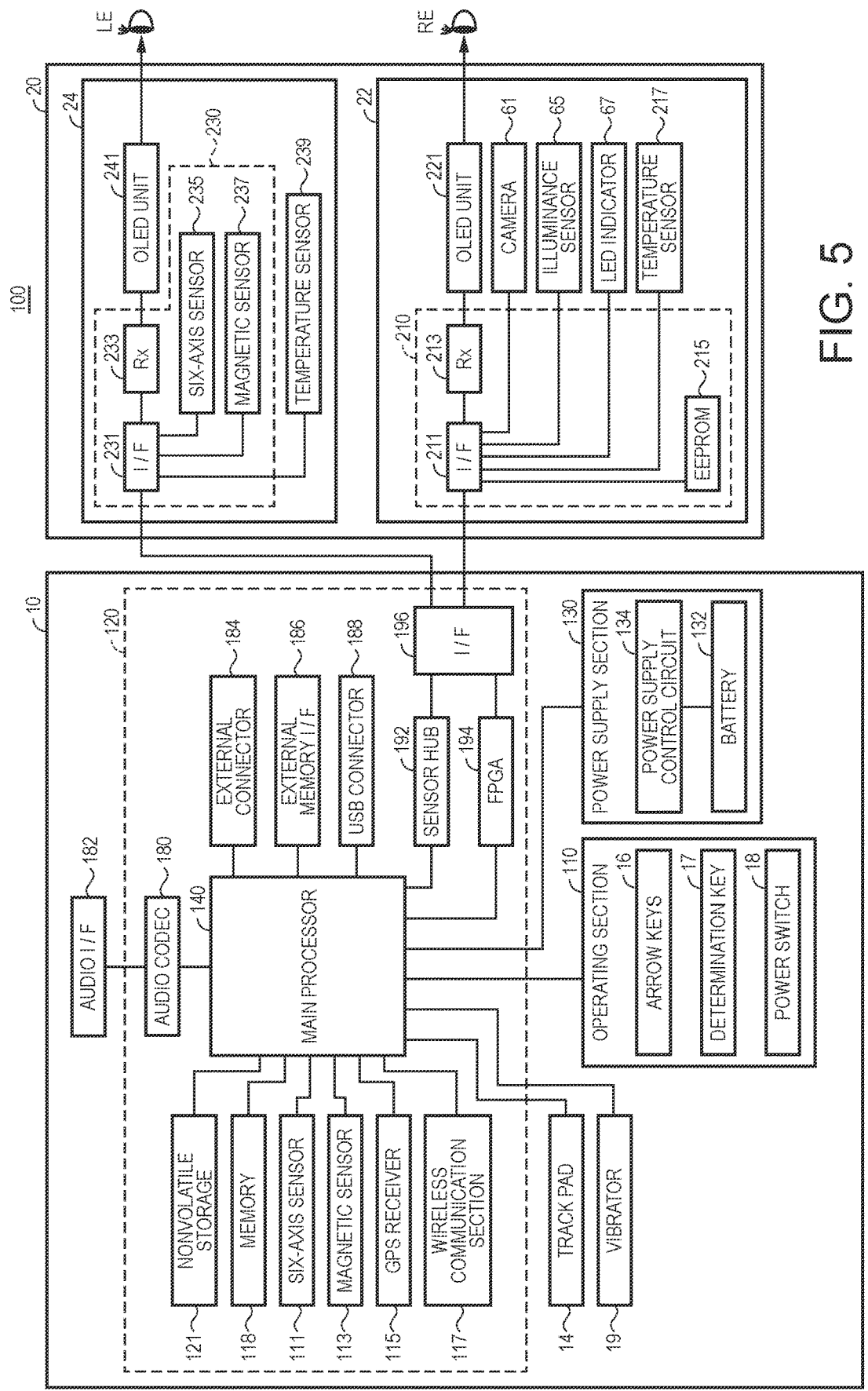
FIG. 5 is a block diagram functionally showing a configuration of the HMD.

As a configuration for making the left eye LE visually recognize the image (AR image), the left display unit 24 is provided with an OLED unit 241 and a left optical system 252. The OLED unit 241 emits the image light. The left optical system 252 is provided with a lens group and so on, and guides the image light L emitted by the OLED unit 241 to the left light guide plate 28. The OLED unit 241 has an OLED panel 243, and an OLED drive circuit 245 for driving the OLED panel 243. The details of the constituents are the same as those of the OLED unit 221, the OLED panel 223, and the OLED drive circuit 225. On the substrate to be fixed to the reverse surface of the OLED panel 243, there is mounted a temperature sensor 239 (FIG. 5). Further, the details of the left optical system 252 are the same as those of the right optical system 251.

According to the configuration described hereinabove, the HMD 100 can function as a see-through type display device. Specifically, the image light L having been reflected by the half mirror 261 and outside light OL having been transmitted through the right light guide plate 26 enter the right eye RE of the user. The image light L having been reflected by a half mirror 281 and the outside light OL having been transmitted through the left light guide plate 28 enter the left eye LE of the user. As described above, the HMD 100 makes the image light L of the image processed inside the HMD 100 and the outside light OL enter the eyes of the user in a superimposed manner. As a result, for the user, it is possible to see the external landscape (the real world) through the right light guide plate 26 and the left light guide plate 28, and at the same time, a virtual image (an image of a virtual image, an AR image) due to the image light L can visually be recognized so as to be superimposed on the external world.

It should be noted that the right optical system 251 and the right light guide plate 26 are also referred to collectively as a "right light guide section," and the left optical system 252 and the left light guide plate 28 are also referred to collectively as a "left light guide section." The configuration of the right light guide section and the left light guide section is not limited to the example described above, but an arbitrary system can be used providing the image is formed in front of the eyes of the user using the image light. For example, as the right light guide section and the left light guide section, it is possible to use a diffractive grating, or to use a semi-transmissive reflecting frame.

In FIG. 1, the control device 10 and the image display section 20 are connected to each other with a connection cable 40. The connection cable 40 is detachably connected to a connector disposed in a lower part of the control device 10, and is connected to a variety of circuits disposed inside the image display section 20 through the tip of the left holding part 23. The connection cable 40 is provided with a metal cable or an optical fiber cable for transmitting the digital data. The connection cable 40 can further include a metal cable for transmitting analog data. In the middle of the connection cable 40, there is disposed a connector 46.

The connector 46 is a jack to which a stereo mini-plug is connected, and the connector 46 and the control device 10 are connected to each other with a line for transmitting, for example, an analog audio signal. In the example of the present embodiment shown in FIG. 1, a right earphone 32 and a left earphone 34 constituting a stereo headphone, and a headset 30 having a microphone 63 are connected to the connector 46.

The microphone 63 is disposed so that a sound collecting section of the microphone 63 points to the eye direction of the user as shown in, for example, FIG. 1. The microphone 63 collects sounds, and then outputs an audio signal to an audio interface 182 (FIG. 5). The microphone 63 can be a monaural microphone or a stereo microphone, or can also be a directional microphone, or an omnidirectional microphone.

The control device 10 is a device for controlling the HMD 100. The control device 10 includes a lighting section 12, a track pad 14, arrow keys 16, a determination key 17, and a power switch 18. The lighting section 12 gives notice of the operating state (e.g., ON/OFF of the power) of the HMD 100 with the light emitting state thereof. As the lighting section 12, there can be used, for example, a light emitting diode (LED).

The track pad 14 detects a touch operation on the operation surface of the track pad 14 to output a signal corresponding to the detection content. As the track pad 14, there can be adopted a variety of types of track pad such as an electrostatic track pad, a pressure-detection track pad, or an optical track pad. The arrow keys 16 detect a holding-down operation to the keys corresponding respectively to upward, downward, rightward, and leftward directions to output a signal corresponding to the detection content. The determination key 17 detects a holding-down operation, and then outputs a signal for determining the content of the operation in the control device 10. The power switch 18 detects a sliding operation of the switch to thereby switch the state of the power of the HMD 100.

Figure 3:
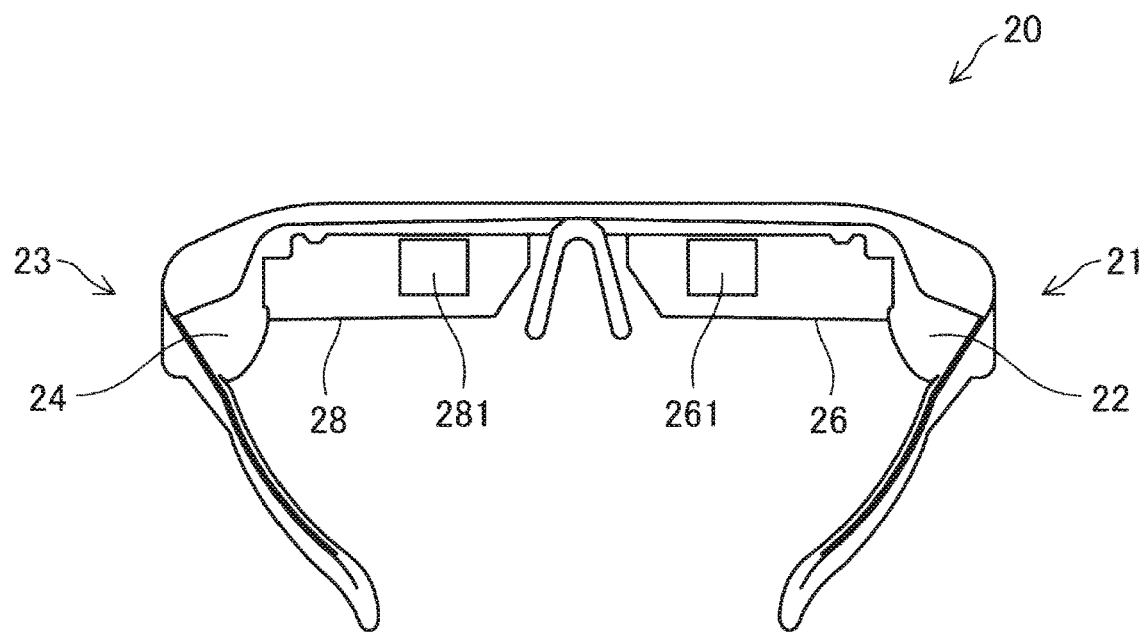
FIG. 3 is a diagram showing a configuration of a substantial part of the image display section viewed from the user.

FIG. 3 is a diagram showing a configuration of a substantial part of the image display section 20 from the viewpoint of the user. In FIG. 3, illustration of the connection cable 40, the right earphone 32, and the left earphone 34 is omitted. In the state shown in FIG. 3, the reverse side of the right light guide plate 26 and the left light guide plate 28 can visually be recognized, and at the same time, each of the half mirror 261 for irradiating the right eye RE with the image light and the half mirror 281 for irradiating the left eye LE with the image light can visually be recognized as a roughly quadrangular area. The user visually recognizes the external landscape through the whole of the right light guide plate 26 and the left light guide plate 28 including these half mirrors 261, 281.

Figure 4:
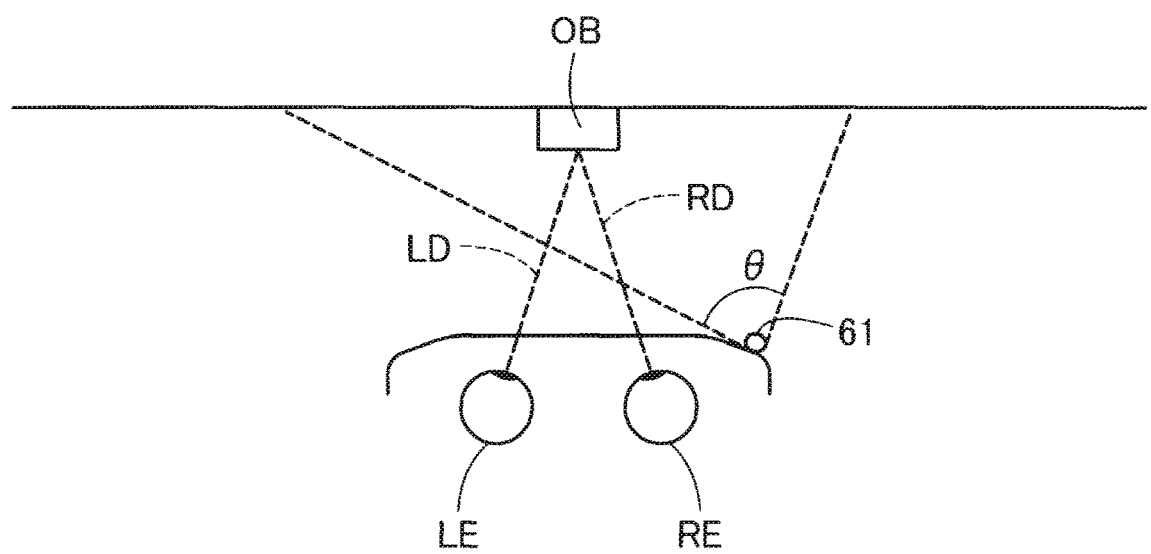
FIG. 4 is a diagram for explaining a field angle of a camera.

FIG. 4 is a diagram for explaining the field angle of the camera 61. In FIG. 4, the camera 61 and the right eye RE and the left eye LE of the user are schematically shown in a planar view, and at the same time, the field angle (the imaging range) of the camera 61 is represented as θ. It should be noted that the field angle θ of the camera 61 spreads in a horizontal direction as illustrated, and in addition, the field angle θ also spreads in a vertical direction similarly to a general digital camera.

As described above, the camera 61 is disposed at the end part on the right side in the image display section 20, and takes an image in the direction of the eyes of the user (i.e., the front of the user). Therefore, the optical axis of the camera 61 is set to a direction including the eye direction of the right eye RE and the left eye LE. The external landscape which can visually be recognized in the state in which the user wears the HMD 100 is not necessarily infinity. For example, if the user gazes at the object OB with the both eyes, the sight lines of the user are pointed to the object OB as indicated by the symbols RD, LD in the drawing. In this case, the distance from the user to the object OB is in a range of 30 cm through 10 m in many cases, and is in a range of 1 m through 4 m in most cases. Therefore, it is also possible to determine targets of an upper limit and a lower limit of the distance from the user to the object OB in an ordinary use with respect to the HMD 100. These targets can be obtained in advance and preset to the HMD 100, or can also be set by the user. It is preferable for the optical axis and the field angle of the camera 61 to be set so that the object OB is included in the field angle in the case in which the distance to the object OB in such ordinary use corresponds to the targets of the upper limit and the lower limit thus set.

It should be noted that in general, it is assumed that the viewing angle of the human is roughly 200 degrees in a horizontal direction and roughly 125 degrees in a vertical direction. Among the ranges, the effective visual field superior in information receiving capacity is in a range of about 30 degrees in the horizontal direction and about 20 degrees in the vertical direction. The stable field of fixation in which the gaze point gazed by the human can promptly and stably be viewed is assumed to be roughly in a range of 60 through 90 degrees in the horizontal direction, and in a range of 45 through 70 degrees in the vertical direction. In this case, if the gaze point is the object OB (FIG. 4), a range of about 30 degrees in the horizontal direction and about 20 degrees in the vertical direction centered on the sight lines RD, LD corresponds to the effective visual field. Further, the range of about 60 through 90 degrees in the horizontal direction and about 45 through 70 degrees in the vertical direction corresponds to the stable field of fixation. The actual visual field to be visually recognized by the user through the image display section 20 and further through the right light guide plate 26 and the left light guide plate 28 is called a field of view (FOV). The field of view is narrower than the viewing angle and the stable field of fixation, but is broader than the effective visual field.

The field angle θ of the camera 61 of the present embodiment is set so as to be able to image a range broader than the visual field of the user. The field angle θ of the camera 61 is preferably set so as to be able to image a range broader than at least the effective visual field of the user, and is more preferably set so as to be able to image a range broader than the field of view. The field angle θ of the camera 61 is more preferably set so as to be able to image a range broader than the stable field of fixation of the user, and is most preferably set so as to be able to image a range broader than the view angle of the both eyes of the user. Therefore, it is also possible to adopt a configuration in which the camera 61 is provided with a so-called wide-angle lens as an imaging lens to be able to image a broader field angle. It is also possible to include a lens called a super-wide angle lens or a semi-wide angle lens in the wide-angle lens. Further, it is also possible for the camera 61 to include a single focus lens, or include a zoom lens, or include a lens group formed of a plurality of lenses.

FIG. 5 is a block diagram functionally showing a configuration of the HMD 100. The control device 10 is provided with a main processor 140 for executing a program to control the HMD 100, a storage section, an input/output section, sensors, an interface, and a power supply section 130. To the main processor 140, there are respectively connected the storage section, the input/output section, the sensors, the interface, and the power supply section 130. The main processor 140 is mounted on a controller board 120 incorporated in the control device 10.

In the storage section, there are included a memory 118 and a nonvolatile storage 121. The memory 118 forms a working area for temporarily storing a computer program executed by the main processor 140 and data to be processed. The nonvolatile storage 121 is formed of a flash memory or an eMMC (embedded multi-media card). The nonvolatile storage 121 stores the computer program executed by the main processor 140 and a variety of types of data to be processed by the main processor 140. In the present embodiment, these storages are mounted on the controller board 120.

In the input/output section, there are included a track pad 14 and an operating section 110. In the operating section 110, there are included the arrow keys 16, the determination key 17, and the power switch 18 provided to the control device 10. The main processor 140 controls these constituents of the input/output section, and obtains signals output from the respective constituents of the input/output section.

The sensors include a six-axis sensor 111, a magnetic sensor 113, and a GPS (global positioning system) receiver 115. The six-axis sensor 111 is a motion sensor (an inertial sensor) provided with a triaxial acceleration sensor and a triaxial gyro (angular velocity) sensor. As the six-axis sensor 111, it is possible to adopt an IMU (inertial measurement unit) having these sensors modularized. The magnetic sensor 113 is, for example, a triaxial geomagnetic sensor. The GPS receiver 115 is provided with a GPS antenna not shown, and receives radio signals transmitted from GPS satellites to detect the coordinate of the actual location of the control device 10. These sensors (the six-axis sensor 111, the magnetic sensor 113, and the GPS receiver 115) output the respective detection values to the main processor 140 in accordance with the sampling frequency designated in advance. The timings at which the sensors output the detection values can also be determined corresponding to the instruction from the main processor 140.

The interface includes a wireless communication section 117, an audio codec 180, an external connector 184, an external memory interface 186, a USB (universal serial bus) connector 188, a sensor hub 192, an FPGA 194, and an interface 196. These constituents function as interfaces with external devices.

The wireless communication section 117 performs wireless communication between the HMD 100 and the external devices. The wireless communication section 117 is configured including an antenna not shown, an RF circuit, a baseband circuit, a communication control circuit, and so on, or is formed of a device having these constituents integrated with each other. The wireless communication section 117 performs the wireless communication compliant with a standard such as Bluetooth (registered trademark), or wireless LAN including Wi-Fi (registered trademark).

The audio codec 180 is connected to the audio interface 182, and performs encode/decode of the audio signal input/output via the audio interface 182. The audio interface 182 is an interface for inputting/outputting the audio signal. The audio codec 180 can also be provided with an A/D converter for performing the conversion from the analog audio signal into digital audio data, and a D/A converter for performing the inverse conversion. The HMD 100 according to the present embodiment outputs a sound from the right earphone 32 and the left earphone 34, and collects a sound with the microphone 63. The audio codec 180 converts the digital audio data output by the main processor 140 into the analog audio signal, and then outputs the analog audio signal via the audio interface 182. Further, the audio codec 180 converts the analog audio signal input to the audio interface 182 into the digital audio data, and then outputs the digital audio data to the main processor 140.

The external connector 184 is a connector for connecting an external device (e.g., a personal computer, a smartphone, and a game machine) communicating with the main processor 140 to the main processor 140. The external device connected to the external connector 184 can be a supply source of a content, and in addition, can be used for debugging the computer program to be executed by the main processor 140, and for collecting the operation logs of the HMD 100. As the external connector 184, there can be adopted a variety of configurations. As the external connector 184, there can be adopted, for example, an interface compatible with wired connection such as a USB interface, a micro USB interface, or an interface for a memory card, and an interface compatible with wireless connection such as a wireless LAN interface, or a Bluetooth interface.

The external memory interface 186 is an interface to which a portable memory device can be connected. The external memory interface 186 includes, for example, a memory card slot for mounting a card-type recording medium to perform reading and writing of data, and an interface circuit. The size, the shape, and the standard, and so on of the card-type recording medium can arbitrarily be selected. The USB connector 188 is an interface to which a memory device, a smartphone, a personal computer, and so on compliant with the USB standard can be connected. The USB connector 188 includes, for example, a connector compliant with the USB standard and an interface circuit. The size, the shape, the version of the USB standard, and so on of the USB connector 188 can arbitrarily be selected.

Further, the HMD 100 is provided with a vibrator 19. The vibrator 19 is provided with a motor not shown, an eccentric rotor not shown, and so on, and generates a vibration in accordance with the control by the main processor 140. In the case in which the HMD 100 has detected the operation to the operating section 110, or the case in which the power of the HMD 100 is switched ON/OFF, for example, the HMD 100 generates the vibration in a predetermined vibration pattern with the vibrator 19. It is also possible to adopt a configuration of providing the vibrator 19 on the image display section 20 side, for example, to the right holding part 21 (a right side part of the temple) of the image display section instead of the configuration of providing the vibrator 19 to the control device 10.

The sensor hub 192 and the FPGA 194 are connected to the image display section 20 via the interface (I/F) 196. The sensor hub 192 obtains the respective detection values of the variety of types of sensors provided to the image display section 20, and then outputs the detection values to the main processor 140. The FPGA 194 performs processing of data transmitted/received between the main processor 140 and the constituents of the image display section 20, and transmission of the data via the interface 196. The interface 196 is connected respectively to the right display unit 22 and the left display unit 24 of the image display section 20. In the example of the present embodiment, the connection cable 40 is connected to the left holding part 23, an interconnection connected to the connection cable 40 is laid inside the image display section 20, and the right display unit 22 and the left display unit 24 are each connected to the interface 196 of the control device 10.

Figure 6:
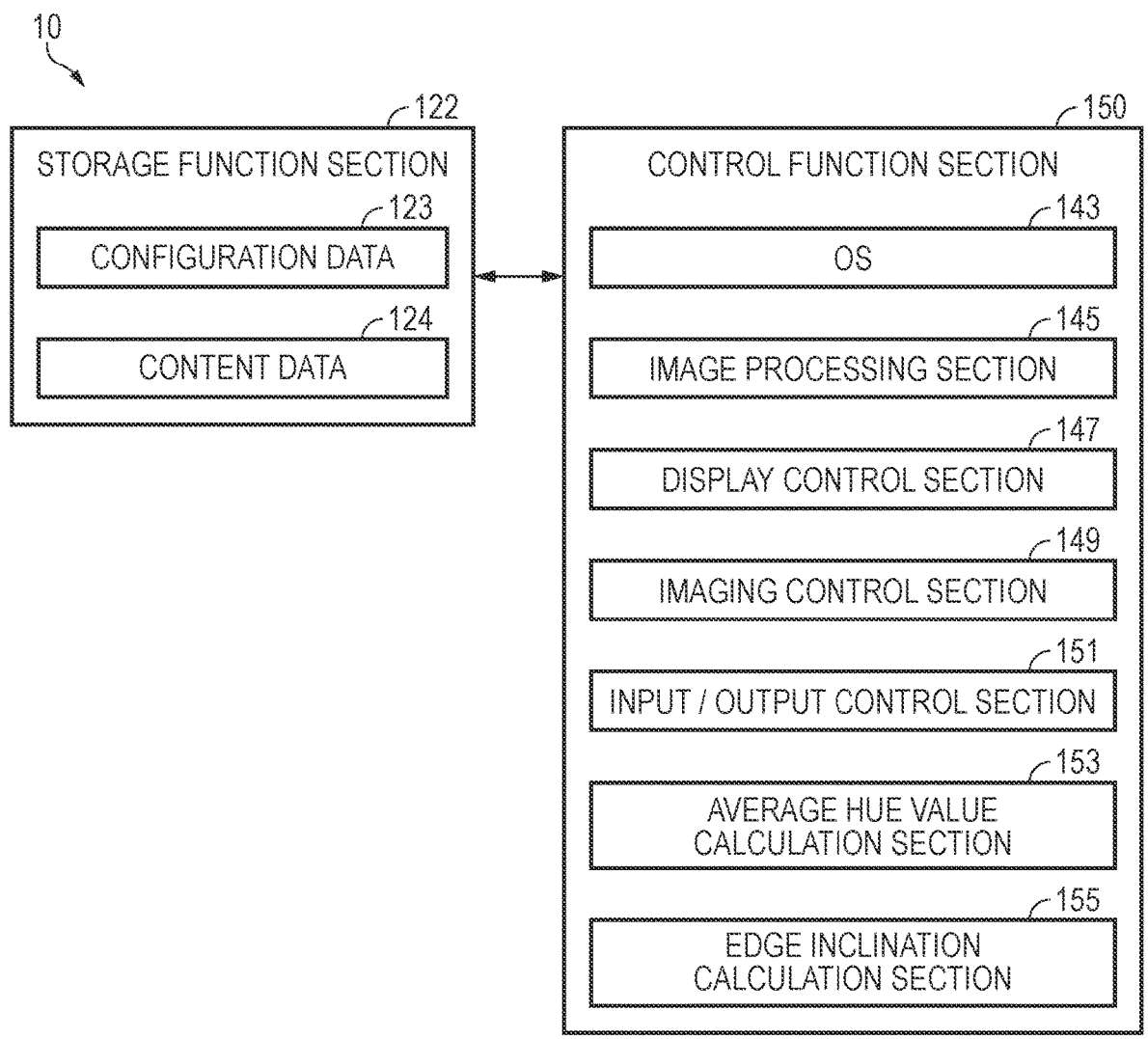
FIG. 6 is a block diagram functionally showing a configuration of a control device.

The power supply section 130 includes a battery 132 and a power supply control circuit 134. The power supply section 130 supplies the electrical power for the control device 10 to operate. The battery 132 is a rechargeable battery. The power supply control circuit 134 performs detection of the remaining capacity of the battery 132, and control of charging to an OS 143 (FIG. 6). The power supply control circuit 134 is connected to the main processor 140, and outputs the detection value of the remaining capacity of the battery 132, and the detection value of the voltage of the battery 132 to the main processor 140. It should be noted that it is also possible to supply the electric power from the control device 10 to the image display section 20 based on the electric power supplied by the power supply section 130. Further, it is also possible to adopt a configuration in which the main processor 140 can control the power supply condition from the power supply section 130 to the constituents of the control device 10 and the image display section 20.

The right display unit 22 is provided with a display unit substrate 210, the OLED unit 221, the camera 61, an illuminance sensor 65, an LED indicator 67, and a temperature sensor 217. On the display unit substrate 210, there are mounted an interface (I/F) 211 to be connected to the interface 196, a receiving section (Rx) 213, and an EEPROM (electrically erasable programmable read-only memory) 215. The receiving section 213 receives the data input from the control device 10 via the interface 211. In the case in which the receiving section 213 has received the image data of the image to be displayed in the OLED unit 221, the receiving section 213 outputs the image data thus received to the OLED drive circuit 225 (FIG. 2).

The EEPROM 215 stores a variety of types of data so that the main processor 140 can retrieve the data. The EEPROM 215 stores, for example, data related to the light emission characteristics and the display characteristics of the OLED units 221, 241 of the image display section 20, and data related to the sensor characteristics of the right display unit 22 or the left display unit 24. Specifically, the EEPROM 215 stores, for example, parameters related to the gamma correction of the OLED units 221, 241, and data for compensating the detection values of the temperature sensors 217, 239 described later. These data are generated by the inspection in the factory shipment of the HMD 100, and written to the EEPROM 215. After the shipment, the main processor 140 retrieves the data in the EEPROM 215 to use in a variety of types of processing.

The camera 61 performs imaging in accordance with a signal input via the interface 211, and then outputs the taken image data or a signal representing the imaging result to the control device 10. The illuminance sensor 65 is disposed in the end part ER of the front frame 27 as shown in FIG. 1, and is arranged so as to receive the outside light from the front of the user wearing the image display section 20. The illuminance sensor 65 outputs the detection value corresponding to an amount of light received (intensity of the light received). The LED indicator 67 is disposed in the vicinity of the camera 61 in the end part ER of the front frame 27 as shown in FIG. 1. The LED indicator 67 is lit while performing imaging by the camera 61 to give notice that imaging is in process.

The temperature sensor 217 detects the temperature, and then outputs a voltage value or a resistance value corresponding to the detected temperature. The temperature sensor 217 is mounted on the reverse surface side of the OLED panel 223 (FIG. 2). The temperature sensor 217 can also be mounted on the same board as, for example, the OLED drive circuit 225. Due to this configuration, the temperature sensor 217 mainly detects the temperature of the OLED panel 223. It should be noted that the temperature sensor 217 can also be incorporated in the OLED panel 223 or the OLED drive circuit 225 (FIG. 2). For example, in the case in which the OLED panel 223 is mounted as an Si-OLED together with the OLED drive circuit 225 as an integrated circuit on an integrated semiconductor chip, it is also possible to implement the temperature sensor 217 in the semiconductor chip.

The left display unit 24 is provided with a display unit substrate 230, the OLED unit 241, and the temperature sensor 239. On the display unit substrate 230, there are mounted an interface (I/F) 231 to be connected to the interface 196, a receiving section (Rx) 233, a six-axis sensor 235, and a magnetic sensor 237. The receiving section 233 receives the data input from the control device 10 via the interface 231. In the case in which the receiving section 233 has received the image data of the image to be displayed in the OLED unit 241, the receiving section 233 outputs the image data thus received to the OLED drive circuit 245 (FIG. 2).

The six-axis sensor 235 is a motion sensor (an inertial sensor) provided with a triaxial acceleration sensor and a triaxial gyro (angular velocity) sensor. As the six-axis sensor 235, it is possible to adopt an IMU having the sensors described above modularized. The magnetic sensor 237 is, for example, a triaxial geomagnetic sensor. The six-axis sensor 235 and the magnetic sensor 237 are provided to the image display section 20, and therefore detects a motion of the head of the user when the image display section 20 is mounted on the head of the user. The orientation of the image display section 20, namely the view of the user, is identified from the motion of the head thus detected.

The temperature sensor 239 detects the temperature, and then outputs a voltage value or a resistance value corresponding to the detected temperature. The temperature sensor 239 is mounted on the reverse surface side of the OLED panel 243 (FIG. 2). The temperature sensor 239 can also be mounted on the same board as, for example, the OLED drive circuit 245. Due to this configuration, the temperature sensor 239 mainly detects the temperature of the OLED panel 243. The temperature sensor 239 can also be incorporated in the OLED panel 243 or the OLED drive circuit 245 (FIG. 2). The details are roughly the same as those of the temperature sensor 217.

The camera 61, the illuminance sensor 65, and the temperature sensor 217 of the right display unit 22, and the six-axis sensor 235, the magnetic sensor 237, and the temperature sensor 239 of the left display unit 24 are connected to the sensor hub 192 of the control device 10. The sensor hub 192 performs setting and initialization of the sampling period of each of the sensors in accordance with the control by the main processor 140. The sensor hub 192 performs energization of each of the sensors, transmission of the control data, acquisition of the detection value, and so on in accordance with the sampling period of each of the sensors. The sensor hub 192 outputs the detection value of each of the sensors provided to the right display unit 22 and the left display unit 24 to the main processor 140 at predetermined timings. The sensor hub 192 can also be provided with a caching function for temporarily holding the detection value of each of the sensors. The sensor hub 192 can also be provided with a conversion function (e.g., a conversion function into a unified format) of the signal format and the data format of the detection value of each of the sensors. The sensor hub 192 starts and stops the energization to the LED indicator 67 in accordance with the control by the main processor 140 to thereby put the LED indicator 67 on and off.

FIG. 6 is a block diagram functionally showing a configuration of the control device 10. The control device 10 is functionally provided with a storage function section 122 and the control function section 150. The storage function section 122 is a logical storage formed of the nonvolatile storage 121 (FIG. 5). Regarding the storage function section 122, it is also possible to adopt a configuration of using the EEPROM 215 and the memory 118 in combination with the nonvolatile storage 121 instead of the configuration of using the storage function section 122 alone. The control function section 150 is constituted by the main processor 140 executing the computer program, namely the hardware and the software cooperating with each other.

In the storage function section 122, there are stored a variety of types of data subjected to the processing in the control function section 150. Specifically, in the storage function section 122 of the present embodiment, there are stored configuration data 123 and content data 124. The configuration data 123 includes a variety of types of setting values related to the operation of the HMD 100. For example, the configuration data 123 includes parameters, determinants, arithmetic expressions, look up tables (LUT), and so on used when the control function section 150 controls the HMD 100. Further, usage modes described later are stored in advance as the configuration data 123.

The content data 124 includes data (e.g., image data, video data, and audio data) of contents including images and pictures to be displayed by the image display section 20 with the control by the control function section 150. It should be noted that the content data 124 can also include data of an interactive content. The interactive content denotes a content of a type that the operating section 110 obtains the operation of the user, the control function section 150 performs the process corresponding to the operation content thus obtained to display the content corresponding to the processing content on the image display section 20. In this case, it is also possible for the data of the content to include image data of a menu screen for obtaining the operation of the user, data for determining processes corresponding to items included in the menu screen, and so on.

The control function section 150 performs a variety of types of processes using the data stored by the storage function section 122 to thereby perform the functions as the OS 143, an image processing section 145, a display control section 147, an imaging control section 149, an input/output control section 151, an average hue value calculation section 153, and an edge inclination calculation section 155. In the present embodiment, the function sections other than the OS 143 are configured as computer programs executed on the OS 143.

The image processing section 145 generates signals to be transmitted to the right display unit 22 and the left display unit 24 based on the image data of the image/picture displayed by the image display section 20. The signals generated by the image processing section 145 can be a vertical sync signal, a horizontal sync signal, a clock signal, an analog image signal, and so on. The image processing section 145 can be formed of hardware (e.g., a DSP (digital signal processor)) different from the main processor 140 besides the configuration realized by the main processor 140 executing the computer program.

It should be noted that the image processing section 145 can also perform a resolution conversion process, an image adjustment process, a 2D/3D conversion process, and so on as needed. The resolution conversion process is a process of converting the resolution of the image data into a resolution suitable for the right display unit 22 and the left display unit 24. The image adjustment process is a process of adjusting the luminance and the chroma of the image data. The 2D/3D conversion process is a process of generating two-dimensional image data from three-dimensional image data, or generating three-dimensional image data from two-dimensional image data. In the case in which the image processing section 145 has performed the processes described above, the image processing section 145 generates a signal for displaying the image based on the image data having been processed, and then transmits the signal thus generated to the image display section 20 via the connection cable 40.

The display control section 147 generates control signals for controlling the right display unit 22 and the left display unit 24, and controls generation and emission of the image light by each of the right display unit 22 and the left display unit 24 using the control signals. Specifically, the display control section 147 controls the OLED drive circuits 225, 245 to make the OLED panels 223, 243 perform the display of the images. The display control section 147 performs control of the timing at which the OLED drive circuits 225, 245 perform drawing to the OLED panels 223, 243, control of the luminance of each of the OLED panels 223, 243, and so on based on the signals output by the image processing section 145.

Further, the display control section 147 controls the display configuration of a pointer image in a pointer image display control process described later. In the pointer image display control process, the pointer image is displayed in a conspicuous manner so that it is easy for the user to visually recognize the pointer image. For example, the display configuration such as the color and the pattern of the pointer image is controlled. The detailed explanation of the pointer image display control process will be described later.

The imaging control section 149 controls the camera 61 to perform imaging to thereby generate the taken image data, and then temporarily stores the taken image data in the storage function section 122. Further, in the case in which the camera 61 is configured as a camera unit including a circuit for generating the taken image data, the imaging control section 149 obtains the taken image data from the camera 61, and then temporarily stores the taken image data in the storage function section 122. Further, in the pointer image display control process described later, the imaging control section 149 performs imaging of the external world to obtain the taken image of the external world in accordance with the instruction of the display control section 147.

The input/output control section 151 appropriately controls the track pad 14 (FIG. 1), the arrow keys 16, and the determination key 17 to obtain an input instruction from these constituents. The instruction thus obtained is output to the OS 143 or the computer program operating on the OS 143 together with the OS 143.

The average hue value calculation section 153 calculates an average hue value of an area including a display position of a pointer image in a reference image described later in the pointer image display control process described later. The edge inclination calculation section 155 calculates edge inclination of the area including the display position of the pointer image in the reference image described later in the pointer image display control process described later.

A2. Augmented Reality Display

Figure 7:
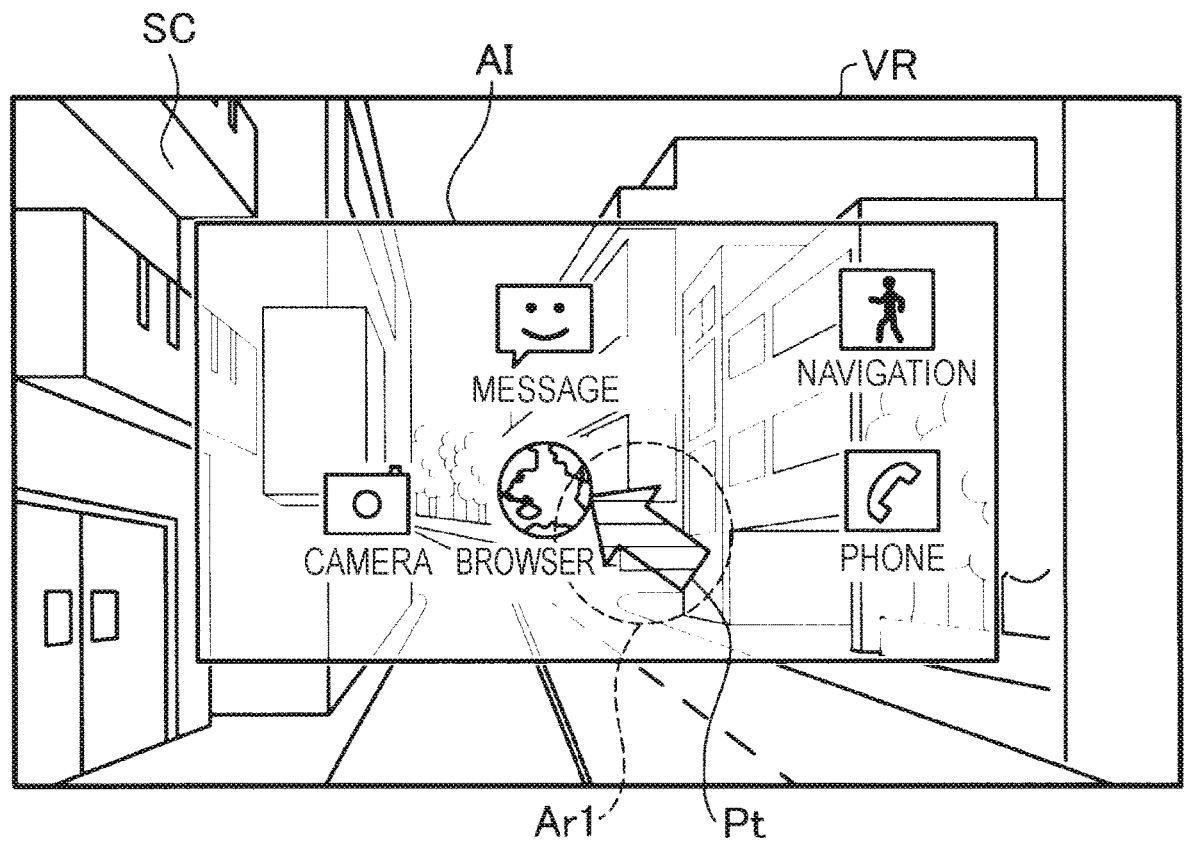
FIG. 7 is an explanatory diagram showing an example of augmented reality display by the HMD.

FIG. 7 is an explanatory diagram showing an example of the augmented reality display by the HMD 100. In FIG. 7, the view VR of the user is illustrated. By the image light guided to both eyes of the user of the HMD 100 forming an image on the retinas of the user in such a manner as described above, the user visually recognizes the target image AI, the display target, as the augmented reality (AR). In the example shown in FIG. 7, the target image AI is the menu screen of the OS of the HMD 100. The menu screen includes icons for starting up the application programs such as "MESSAGE," "PHONE," "CAMERA," "BROWSER," and "NAVIGATION." Further, by the right light guide plate 26 and the left light guide plate 28 transmitting the light from the external world, the user visually recognizes the external world SC. As described above, it is possible for the user of the HMD 100 according to the present embodiment to see the target image AI so as to overlap the external world SC with respect to a part of the view VR in which the target image AI is displayed. Further, regarding a part of the view VR in which the target image AI is not displayed, the external world SC alone can be seen.

As shown in FIG. 7, on the target image AI, there is displayed a pointer image Pt. In FIG. 7, for the sake of convenience of explanation, the pointer image Pt is shown in an enlarged manner compared to the pointer image Pt actually viewed by the user. The pointer image Pt is used for the user to select the menus displayed on the target image AI. In the example shown in FIG. 7, the user sets the pointer image Pt on a browser icon on the target image AI to thereby select the browser menu. It is possible for the user to execute the browser menu by making a tap action or the like on the track pad 14 in this state.

In the present embodiment, the "pointer image" is an index of the operation position related to the GUI operation, and denotes the index indicating the operation target position in the target image AI, and in the present embodiment, denotes the mouse pointer image. It should be noted that the mouse pointer is not a limitation, but it is also possible to use an arbitrary pointer image such as a marker or a mouse cursor. In the example shown in FIG. 7, the pointer image Pt has an arrow shape. It should be noted that the shape of the pointer image Pt is not limited to the arrow shape, but can also be a geometric graphic such as a circle, a triangle, or a quadrangle, a symbol, and so on. Further, it is possible to adopt a configuration in which the pointer image Pt is provided with a pattern. In the present embodiment, the pattern of the pointer image Pt has directionality. Specifically, as shown in FIG. 7, the pointer image Pt is provided with the pattern repeated in a certain direction. It should be noted that the detailed explanation with respect to the pattern will be described later.

As described above, since the user views the target image AI so as to overlap the external world SC, in general, it is difficult for the user to visually recognize the pointer image Pt in some cases depending on the features of the external world SC and the target image AI such as the chroma, the luminance, and the hue. However, by controlling the display configuration of the pointer image Pt in accordance with the feature quantity of the taken image of the external world SC, the target image AI, or a composite image of these images to display the pointer image Pt, the visibility of the pointer image Pt is improved.

A3. Pointer Image Display Control Process

Figure 8:
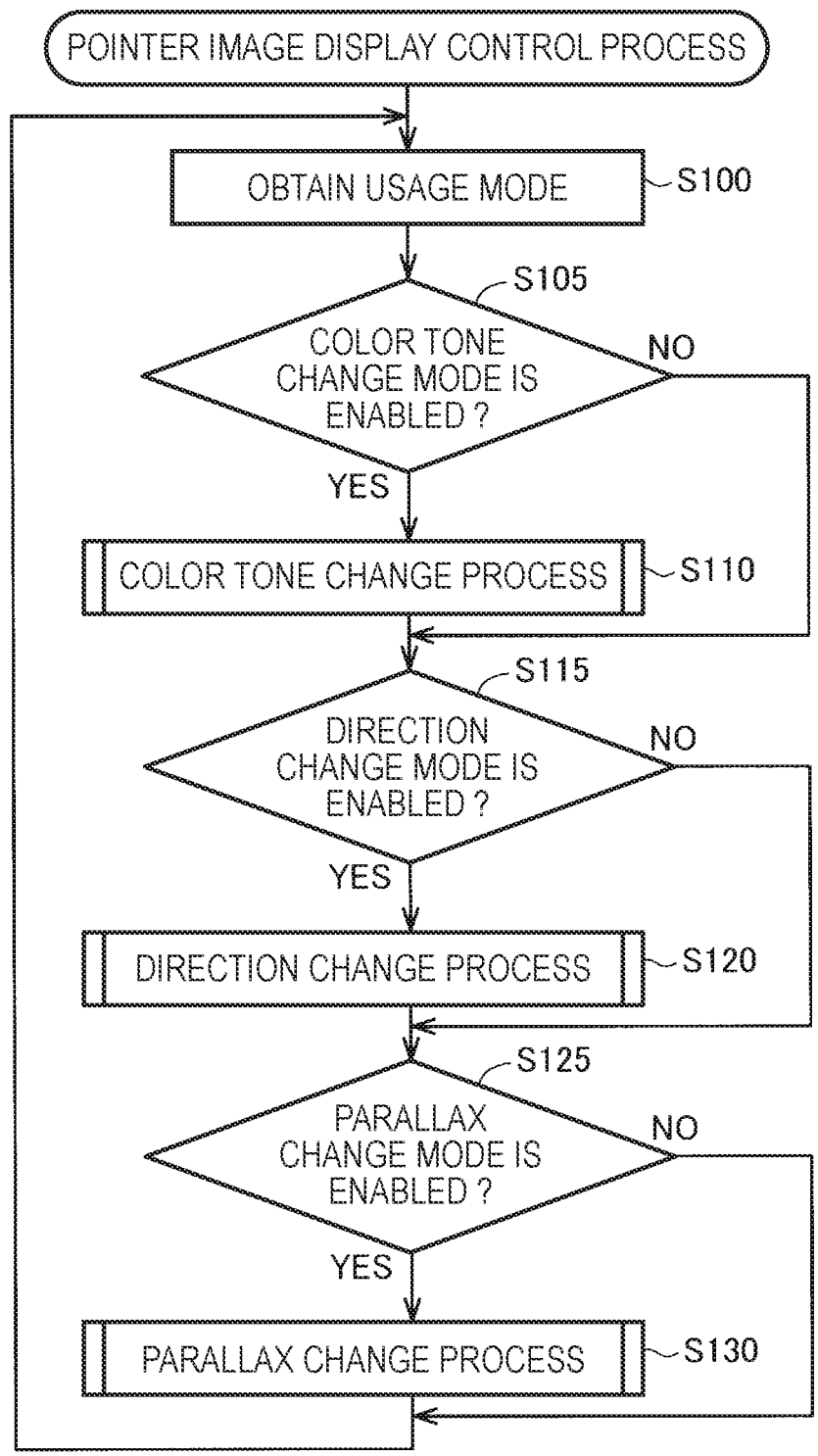
FIG. 8 is a flowchart showing a processing procedure of a pointer image display control process.

FIG. 8 is a flowchart showing a processing procedure of the pointer image display control process. In the pointer image display control process, the display configuration of the pointer image Pt is changed in accordance with a usage mode. The pointer image display control process is started when the user sets the power switch 18 to the ON state. As shown in FIG. 8, the display control section 147 obtains (step S100) the usage mode from the configuration data 123.

The usage mode denotes a mode for changing the display configuration of the pointer image Pt, and in the present embodiment, there exist totally three types of modes, namely a "color tone change mode," a "direction change mode," and a "parallax change mode." The "color tone change mode" denotes a mode for changing the color of the pointer image Pt to display the pointer image Pt. The "direction change mode" denotes a mode for changing the direction of the pattern of the pointer image Pt to display the pointer image Pt. The "parallax change mode" denotes a mode for providing parallax to the pointer image Pt to display the pointer image Pt. It is possible for the user to selectively set each of the three modes to an enabled state or a disabled state independently of each other, and the availability information with respect to each of the modes is stored in the storage function section 122 as the configuration data 123. It should be noted that in the present embodiment, all of the three modes described above are set in advance to the enabled state.

After executing the step S100, the display control section 147 determines (step S105) whether or not the color tone change mode is in the enabled state. In the case in which it has been determined that the color tone change mode is not in the enabled state (NO in the step S105), the color tone change process (step S110) is not performed. In contrast, in the case in which it has been determined that the color tone change mode is in the enabled state (YES in the step S105), the display control section 147 performs (step S110) the color tone change process.

Figure 9:
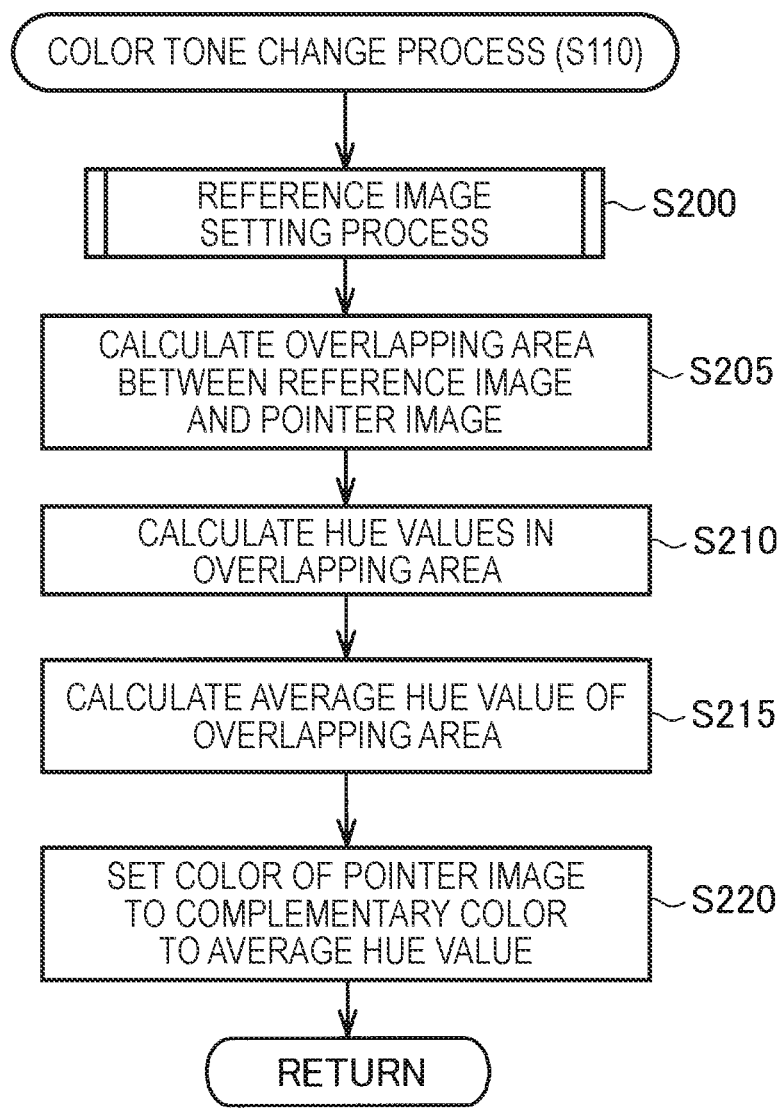
FIG. 9 is a flowchart showing a detailed processing procedure of a color tone change process (step S110).

FIG. 9 is a flowchart showing a detailed processing procedure of the color tone change process (step S110). As shown in FIG. 9, the display control section 147 performs (step S200) a reference image setting process. In the present embodiment, a "reference image" denotes an image the feature quantity of which is considered when changing the display configuration of the pointer image Pt. The reference image is set by the display control section 147 to either one of the external world image obtained by imaging, the target image AI, and the composite image of the external world image obtained by imaging and the target image AI.

Figure 10:
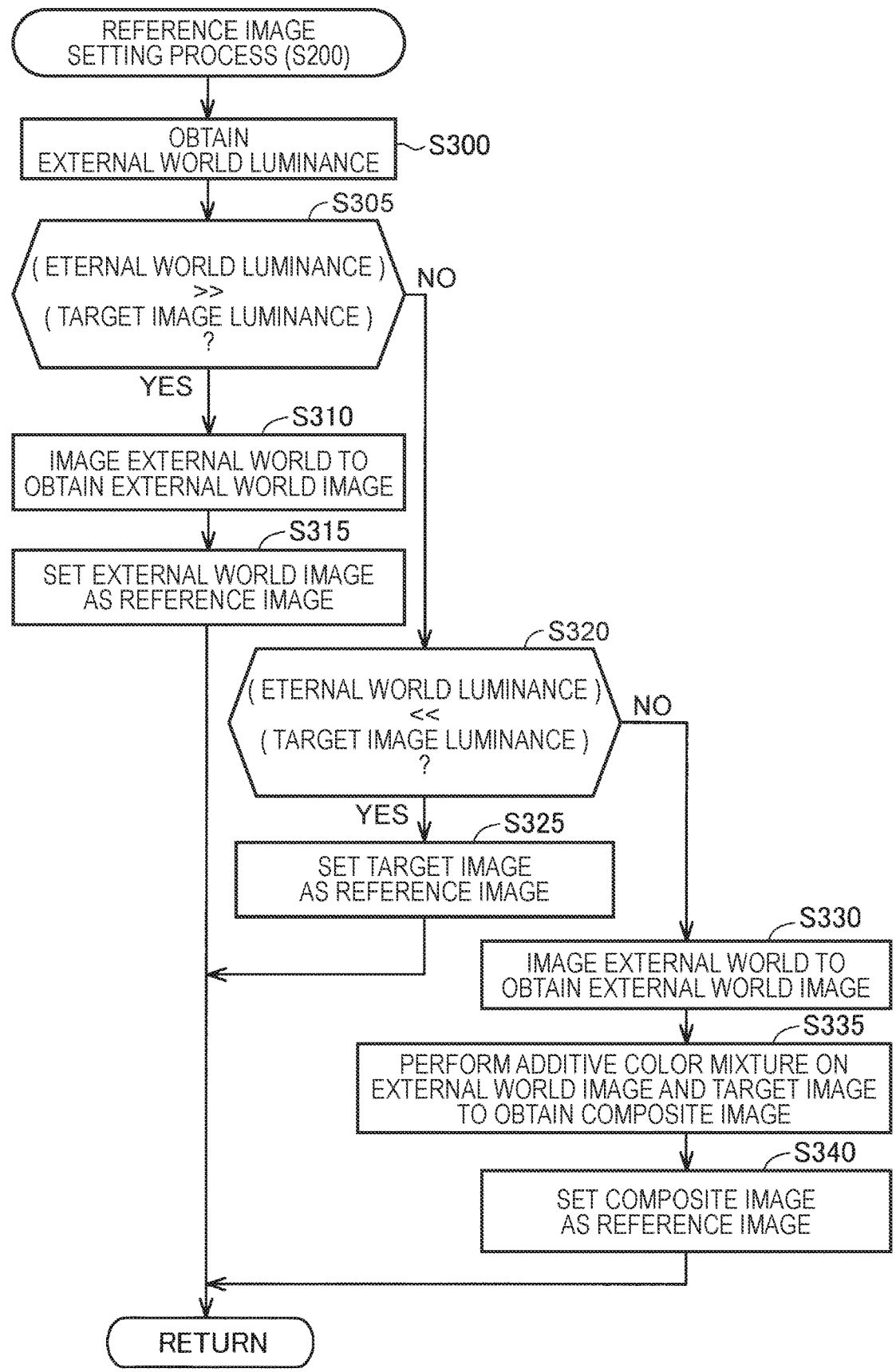
FIG. 10 is a flowchart showing a detailed processing procedure of a reference image setting process (step S200).

FIG. 10 is a flowchart showing a detailed processing procedure of the reference image setting process (step S200). As shown in FIG. 10, the display control section 147 obtains (step S300) external world luminance. Specifically, the display control section 147 obtains the external world luminance based on the detection value corresponding to the amount of the outside light received obtained by the illuminance sensor 65.

After executing the step S300, the display control section 147 determines (step S305) whether or not the external world luminance is remarkably high compared to the target image luminance. The target image luminance is calculated as an average value of the luminance values obtained by converting the RGB values of all of the pixels of the target image AI. The display control section 147 determines a threshold value in advance, and determines that the external world luminance is remarkably high compared to the target image luminance in the case in which the absolute value of the difference between the external world luminance and the target image luminance is greater than the threshold value. In contrast, in the case in which the absolute value of the difference between the external world luminance and the target image luminance is not greater than the threshold value, the display control section 147 determines that the external world luminance is not remarkably high compared to the target image luminance. In the case in which it has been determined that the external world luminance is remarkably high compared to the target image luminance (YES in the step S305), the imaging control section 149 makes the camera 61 image the external world to obtain (step S310) the external world image. After executing the step S310, the display control section 147 sets (step S315) the external world image obtained by imaging as the reference image. After executing the step S315, the reference image setting process (step S200) is terminated, and the step S205 described later shown in FIG. 9 is executed.

In the case in which it has been determined that the external world luminance is not remarkably high compared to the target image luminance in the step S305 described above (NO in the step S305), the display control section 147 determines (step S320) whether or not the external world luminance is remarkably low compared to the target image luminance. In the case in which it has been determined that the external world luminance is remarkably low compared to the target image luminance (YES in the step S320), the display control section 147 sets (step S325) the target image AI as the reference image. After executing the step S325, the reference image setting process (step S200) is terminated, and the step S205 described later shown in FIG. 9 is executed similarly to the process performed after executing the step S315 described above.

In the case in which it has been determined that the external world luminance is not remarkably low compared to the target image luminance (NO in the step S320) in the step S320 described above, the imaging control section 149 makes the camera 61 image the external world to obtain (step S330) the external world image similarly to the step S310 described above. After executing the step S330, the display control section 147 performs the additive color mixture on the external world image obtained by imaging and the target image AI to obtain (step S335) the composite image. It should be noted that the additive color mixture is a known technology, and therefore, the detailed description thereof will be omitted. In the step S335, the target of the additive color mixture is the whole of the images. After executing the step S335, the display control section 147 sets (step S340) the composite image as the reference image. After executing the step S340, the reference image setting process (step S200) is terminated, and the step S205 described later shown in FIG. 9 is executed similarly to the process performed after executing the step S315 and the step S325 described above.

As shown in FIG. 9, after completing the step S200, the display control section 147 calculates (step S205) an overlapping area between the reference image and the pointer image Pt. In the present embodiment, the "overlapping area" denotes an area including the display position of the pointer image Pt in the reference image, and the area having a roughly circular shape centered on the midpoint of the length in the longitudinal direction of the pointer image Pt. In the example shown in FIG. 7, the area Ar1 is calculated as the overlapping area. The area Ar1 is an area including a peripheral area of the pointer image Pt in addition to the pointer image Pt.

As shown in FIG. 9, after executing the step S205, the display control section 147 obtains (step S210) the hue value of the overlapping area Ar1. Specifically, the display control section 147 obtains the hue value (a hue angle) of each of the pixels in the overlapping area Ar1. After executing the step S210, the display control section 147 calculates (step S215) the average hue value of the overlapping area Ar1. Specifically, the display control section 147 divides the sum of the hue values of the respective pixels in the overlapping area Ar1 obtained in the step S210 described above by the number of pixels in the overlapping area to thereby calculate the average hue value.

After executing the step S215, the display control section 147 sets (step S220) the color of the pointer image Pt to the complementary color to the average hue value. In the present embodiment, the "complementary color" denotes the color of the pointer image Pt having a hue value representing the hue, the angle (the hue angle) of which formed with the hue represented by the average hue value is 180 degrees in the Munsell hue circle. Further, the "complementary color" denotes a broad sense including the case in which, for example, the hue angle is within a range of 180 degrees±45 degrees in addition to the case in which the hue angle is just 180 degrees. It should be noted that the hue circle is not limited to the Munsell hue circle, but can also be, for example, the PCCS hue circle, or the Ostwald hue circle. Further, it is not required for the hue circle to have the colors of red, yellow, green, blue, violet, and so on continuously connected to one another.

In the step S220, when the pointer image Pt is displayed with the color set to the complementary color to the average hue value, the color tone change process (step S110) is terminated.

Figure 11:
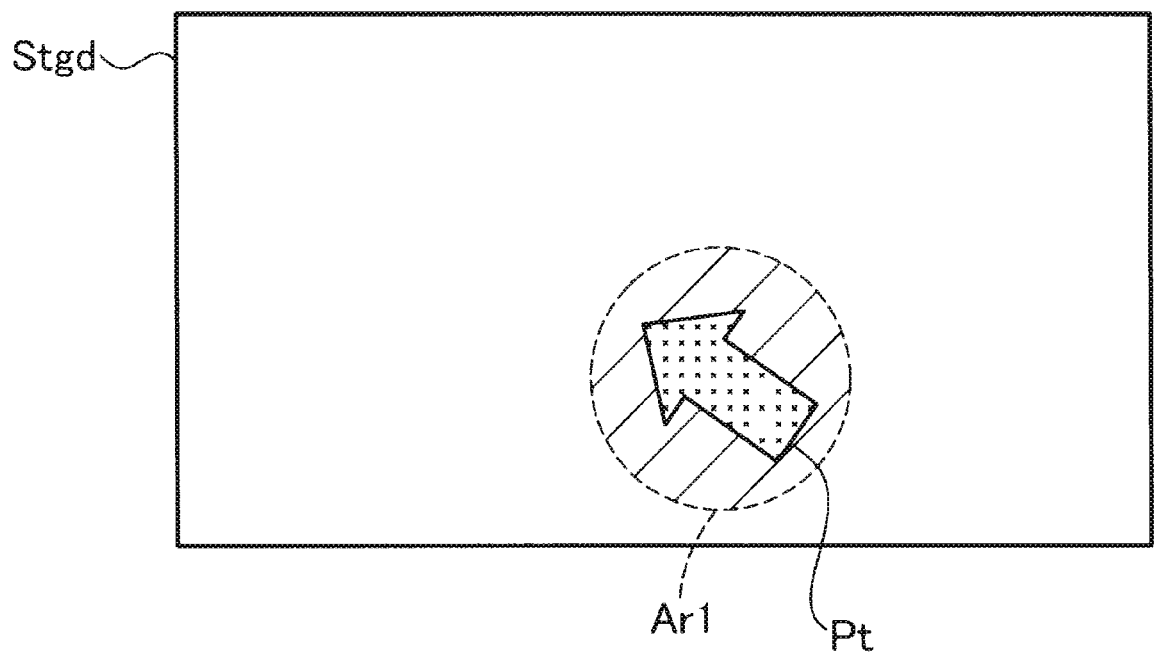
FIG. 11 is an explanatory diagram schematically showing an example of a pointer image after executing the color tone change process (step S110).
Figure 11:
Figure 11:

FIG. 11 is an explanatory diagram schematically showing an example of the pointer image Pt after executing the color tone change process (step S110). In FIG. 11, for the sake of convenience of explanation, the overlapping area Ar1 and the pointer image Pt in the reference image Stgd are shown with a magnification higher than that in the example shown in FIG. 7. Further, the colors of the overlapping area Ar1 and the pointer image Pt are expressed by hatching. As shown in FIG. 11, the pointer image Pt is displayed with the complementary color to the color of the average hue value of the overlapping area Ar1. Therefore, the pointer image Pt becomes conspicuous with respect to the area except the pointer image Pt in the overlapping area Ar1, and the visibility of the pointer image Pt is improved.

As shown in FIG. 8, after executing the color tone change process (step S110), the display control section 147 determines (step S115) whether or not the direction change mode is in the enabled state. In the case in which it has been determined that the direction change mode is not in the enabled state (NO in the step S115), the direction change process (step S120) is not performed. In contrast, in the case in which it has been determined that the direction change mode is in the enabled state (YES in the step S115), the display control section 147 performs (step S120) the direction change process.

Figure 12:
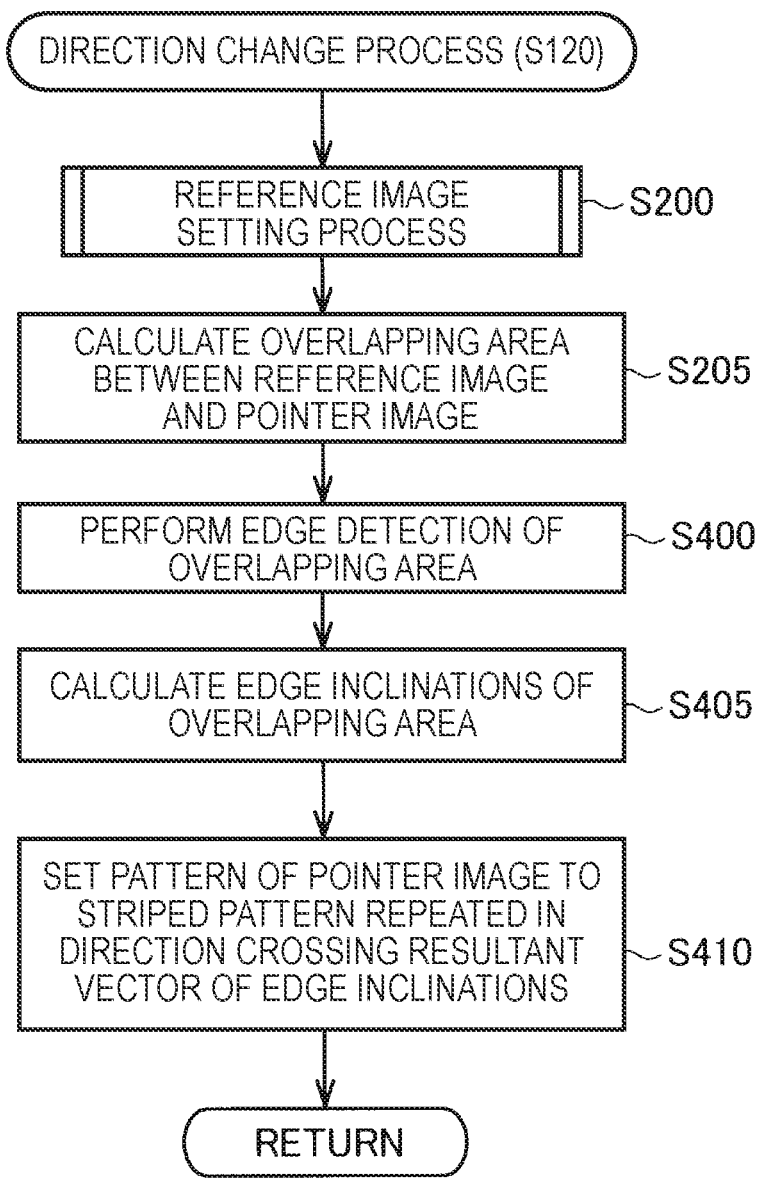
FIG. 12 is a flowchart showing a detailed processing procedure of a direction change process (step S120).

FIG. 12 is a flowchart showing a detailed processing procedure of the direction change process (step S120). When the direction change process is started, the same process as in the step S200 and the step S205 described above is performed first. Therefore, the reference image is set, and the overlapping area Ar1 is calculated.

As shown in FIG. 12, after executing the step S205, the display control section 147 performs (step S400) edge detection of the overlapping area Ar1. In the step S400, the edge detection is performed using a known image processing technology such as the Canny method.

After executing the step S400, the display control section 147 calculates (step S405) the edge inclination of the overlapping area Ar1. In the present embodiment, the "edge inclination" denotes a vector having a base point at an edge point closer to the origin in the edge when defining the end of the reference image as the origin, and having an end point at an edge point farther from the origin. In the step S405, the resultant vector of all of the edge inclinations detected in the step S400 is calculated as the edge inclination.

After executing the step S405, the display control section 147 sets (step S410) a striped pattern repeated in a direction crossing the resultant vector of the edge inclination as the pattern of the pointer image Pt. After executing the step S410, the direction change process (step S120) is terminated.

Figure 13:
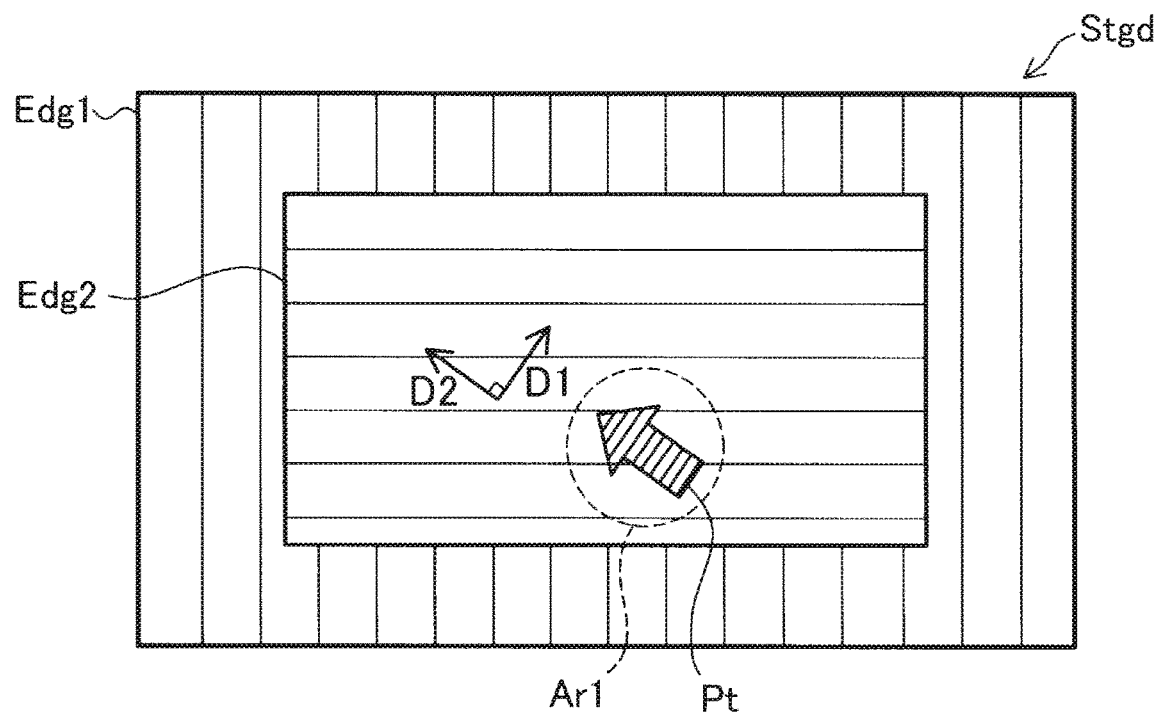
FIG. 13 is an explanatory diagram schematically showing an example of the pointer image after executing the direction change process (step S120).

FIG. 13 is an explanatory diagram schematically showing an example of the pointer image Pt after executing the direction change process (step S120). FIG. 13 shows the case in which the composite image is used as the reference image Stgd. In FIG. 13, the X axis represents a direction parallel to the long side of the reference image Stgd, and the Y axis represents a direction parallel to the short side of the reference image Stgd. In the example shown in FIG. 13, the edge inclination Edg1 of the overlapping area Ar1 in the external world image is a vector parallel to the Y axis, and the edge inclination Edg2 of the overlapping area Ar1 in the target image AI is a vector parallel to the X axis. Therefore, the resultant vector of the edge inclination Edg1 and the edge inclination Edg2 in the overlapping area Ar1 becomes a vector along the direction D1. Therefore, in the step S410, the pointer image Pt is displayed with the pattern of the pointer image Pt set to the striped pattern repeated in the direction D2 perpendicular to the direction D1.

As shown in FIG. 8, after executing the direction change process (step S120), the display control section 147 determines (step S125) whether or not the parallax change mode is in the enabled state. In the case in which it has been determined that the parallax change mode is not in the enabled state (NO in the step S125), the parallax change process (step S130) is not performed, and the process returns to the step S100 described above. In contrast, in the case in which it has been determined that the parallax change mode is in the enabled state (YES in the step S125), the display control section 147 performs (step S130) the parallax change process.

Figure 14:
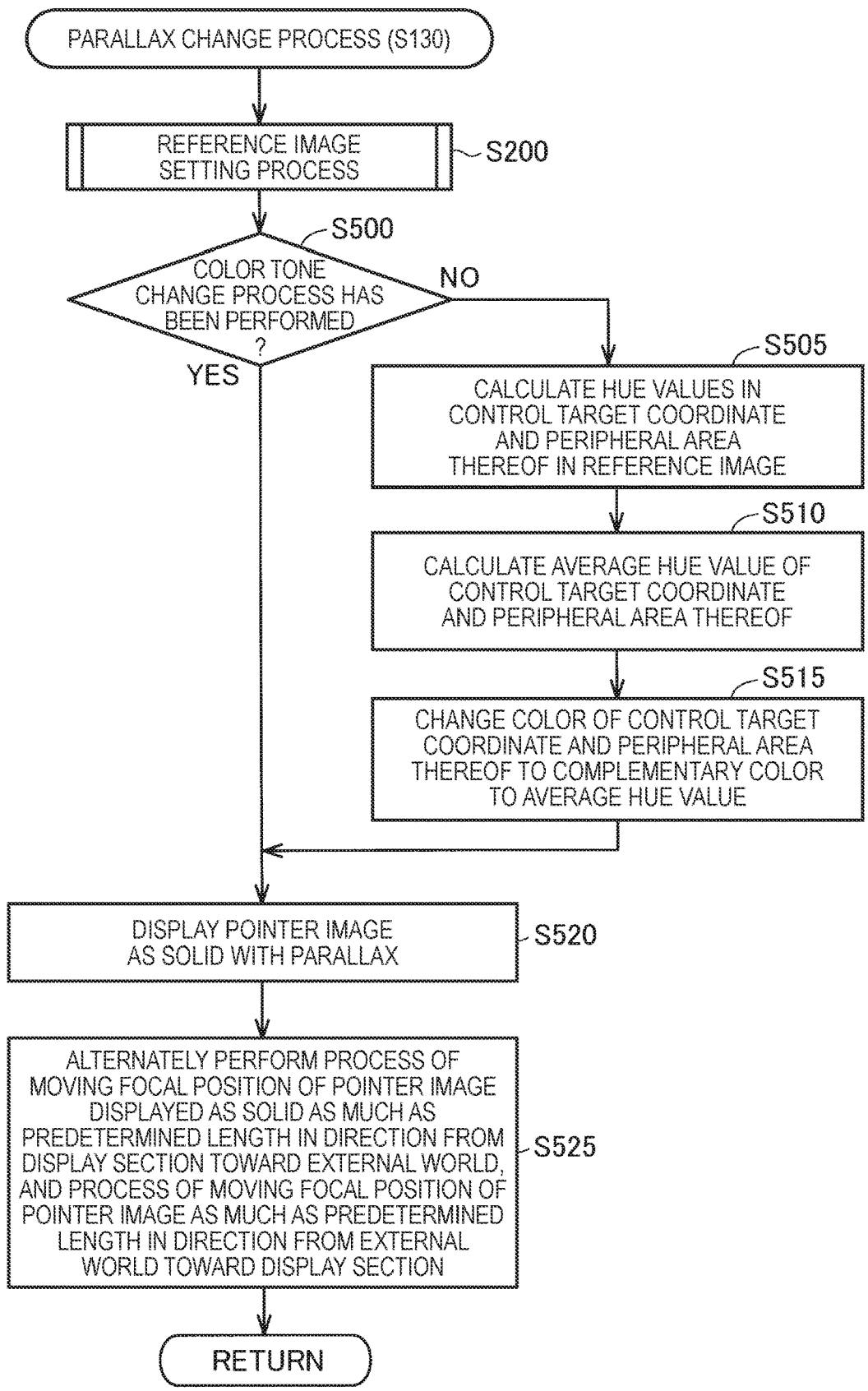
FIG. 14 is a flowchart showing a detailed processing procedure of a parallax change process (step S130).

FIG. 14 is a flowchart showing a detailed processing procedure of the parallax change process (step S130). As shown in FIG. 14, when the parallax change process is started, the same process as in the step S200 described above is performed first. Therefore, the reference image is set. After executing the step S200, the display control section 147 determines (step S500) whether or not the color tone change process (step S110) has been performed. In the case in which it has been determined that the color tone change process has not been performed (NO in the step S500), the display control section 147 calculates (step S505) the hue value in a control target coordinate and the peripheral area thereof in the reference image. In the present embodiment, the "control target coordinate" denotes the coordinate to be the target of the parallax change process out of the pointer image Pt. Further, the "peripheral area" denotes an area including the area where the translation of the pointer image Pt is expected when displaying the pointer image Pt with parallax. It should be noted that in the present embodiment, the maximum translation area of the pointer image Pt when displaying the pointer image Pt with parallax is set in advance as the peripheral area. In the step S505, the display control section 147 calculates the hue value in the control target coordinate and the peripheral area thereof in the reference image in roughly the same procedure as in the step S210 in the color tone change process (step S110) described above.

After executing the step S505, the display control section 147 calculates (step S510) the average hue value of the control target and the peripheral area thereof. In the step S510, similarly to the step S215 in the color tone change process (step S110) described above, by obtaining the sum of the hue values calculated in the step S505, and then dividing the result by the number of pixels in the control target and the peripheral area thereof, the average hue value is calculated.

After executing the step S510, the display control section 147 sets (step S515) the complementary color to the average hue value as the average hue value of the control target and the peripheral thereof. In the step S515, similarly to the step S220 in the color tone change mode (step S100) described above, the complementary color to the average hue value of the control target and the peripheral area thereof is set.

After executing the step S515, the display control section 147 displays (step S520) the pointer image Pt as a solid with parallax. Specifically, the display control section 147 displays the pointer image Pt with parallax as a solid based on the default value of the variation in parallax set in advance in the display control section 147.

After executing the step S520, the display control section 147 alternately performs (step S525) a process of moving the focal position of the pointer image Pt displayed as a solid in the direction from the image display section 20 toward the external world as much as a predetermined length, and a process of moving the focal position of the pointer image Pt in the direction from the external world toward the image display section 20 as much as a predetermined length. Specifically, defining the focal position between the pointer image Pt and the user in the state in which the pointer image Pt is displayed on the image display section 20 as a reference position, the display control section 147 moves the focal position from the reference position in the direction toward the external world as much as a predetermined length. Further, the display control section 147 moves the focal position having been moved in the direction from the external world toward the image display section 20 as much as a predetermined length. After executing the step S525, the parallax change process (step S130) is terminated, and the process returns to the step S100 described above as shown in FIG. 8.

In the step S500 described above, in the case in which it has been determined that the color tone change process has been performed (YES in the step S500), the display control section 147 executes the step S520 and the step S525, and terminates the parallax change process (step S130). Then, as shown in FIG. 8, the process returns to the step S100 described above.

It should be noted that the step S505 through the step S515 described above correspond to a process performed for preventing the control target coordinate from becoming difficult to distinguish due to the execution of the step S520 and the step S525 described above. Further, these processes are processes corresponding to the step S210 through the step S220 in the color tone change process (step S110) shown in FIG. 9. Therefore, as shown in FIG. 14, in the case in which the color tone change process (step S110) has already been performed, such a process is not performed again in the parallax change process (step S130).

Figure 15:
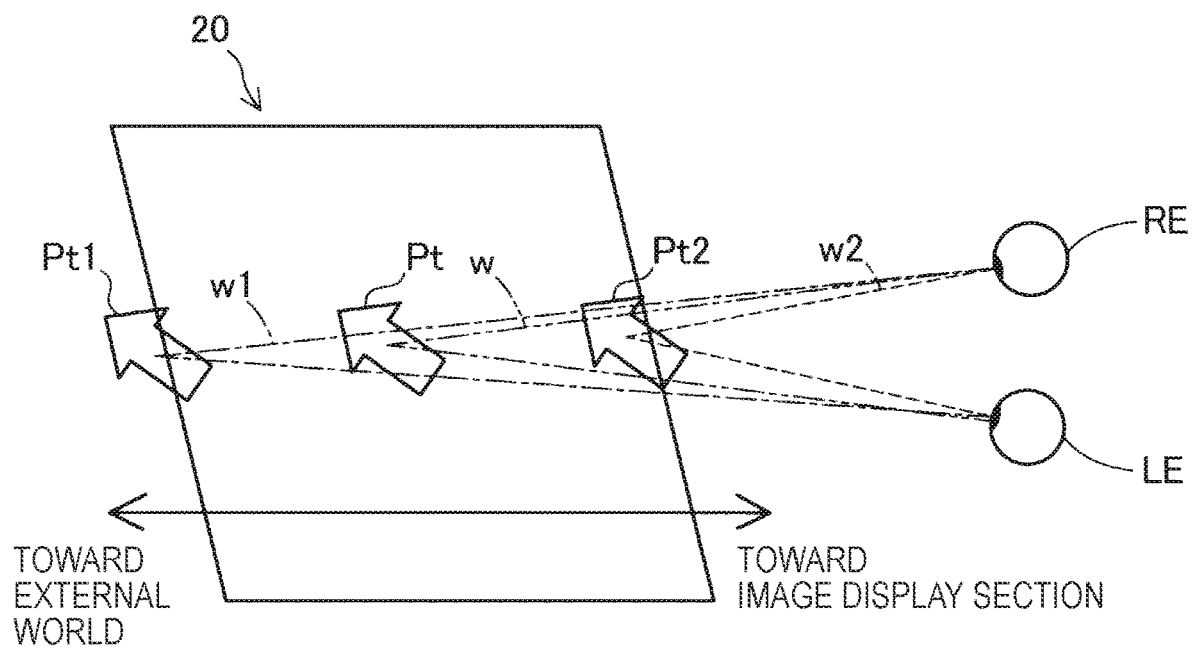
FIG. 15 is an explanatory diagram schematically showing an example of the pointer image after executing the parallax change process (step S130).

FIG. 15 is an explanatory diagram schematically showing an example of the pointer image Pt after executing the parallax change process (step S130). In FIG. 15, there is shown a state in which the focal position of the pointer image Pt is not moved. Further, the pointer image Pt1 represents the state in which the focal position has been moved in the direction from the image display section 20 toward the external world as much as a predetermined length, and the pointer image Pt2 represents the state in which the focal position has been moved in the direction from the external world toward the image display section 20 as much as a predetermined length.

As shown in FIG. 15, the focal distance between the pointer image Pt, and the right eye RE and the left eye LE of the user is the focal distance w. The focal distance w1 between the pointer image Pt1, and the right eye RE and the left eye LE of the user is longer than the focal distance w. Therefore, since the pointer image Pt1 looks farther from the user compared to the pointer image Pt, the pointer image Pt1 can visually be recognized as a recessed shape of the pointer image Pt. In contrast, the focal distance w2 between the pointer image Pt2, and the right eye RE and the left eye LE of the user is shorter than the focal distance w. Therefore, since the pointer image Pt2 looks closer to the user compared to the pointer image Pt, the pointer image Pt2 can visually be recognized as a protruded shape of the pointer image Pt.

According to the HMD 100 of the first embodiment described hereinabove, using one of the external world image obtained by imaging, the target image AI, and the composite image of the external world image and the target image AI as the reference image Stgd, the pointer image Pt is displayed while changing the display configuration thereof in accordance with the feature quantity (the average hue value and the edge inclination) of the area Ar1 including the display position of the pointer image Pt in the reference image Stgd. Therefore, it is possible to display the pointer image Pt with the display configuration obtained by taking the features of the reference image Stgd into consideration, and thus, the visibility of the pointer image Pt can be improved.

Further, since the reference image Stgd is the composite image, it is possible to control the display configuration of the pointer image Pt taking the feature quantity of the external world image and the target image AI into consideration. Therefore, in the case in which the target image AI is displayed so as to be superimposed on the external world visually recognized in a see-through manner, and the pointer image Pt is further displayed in a superimposed manner, the visibility of the pointer image Pt can be improved.

In addition, since the pointer image Pt is displayed with the color changed to the complementary color to the average hue value, it is possible to make the pointer image Pt easier to visually recognize compared to the configuration in which the color of the pointer image Pt is not the complementary color to the average hue value.

Further, since the pointer image Pt is displayed with the pattern changed to the pattern having the directionality determined based on the edge inclination, it is possible to enhance the visibility of the pattern of the pointer image Pt to improve the visibility of the pointer image Pt itself.

In addition, since the pointer image Pt is displayed with the pattern changed to the striped pattern repeated in a direction perpendicular to the resultant vector of the edge inclinations, it is possible to enhance the visibility of the striped pattern of the pointer image Pt to improve the visibility of the pointer image Pt itself.

In addition, since the process of moving the focal position of the pointer image Pt displayed as a solid in a direction from the image display section 20 toward the external world as much as a predetermined length and a process of moving the focal position in a direction from the external world toward the image display section 20 as much as a predetermined length are performed alternately, it is possible to alternately perform a process of displaying the pointer image Pt displayed as a solid in a recessed manner and a process of displaying the pointer image Pt in a protruded manner, and thus, the visibility of the pointer image Pt can further be improved.

B. Second Embodiment

B1. Overall Configuration of Transmissive Display Device

The head-mounted display device 100 in the second embodiment is the same as the head-mounted display device 100 in the first embodiment shown in FIG. 1, and therefore, the detailed description thereof will be omitted.

B2. Pointer Image Display Control Process

Figure 16:
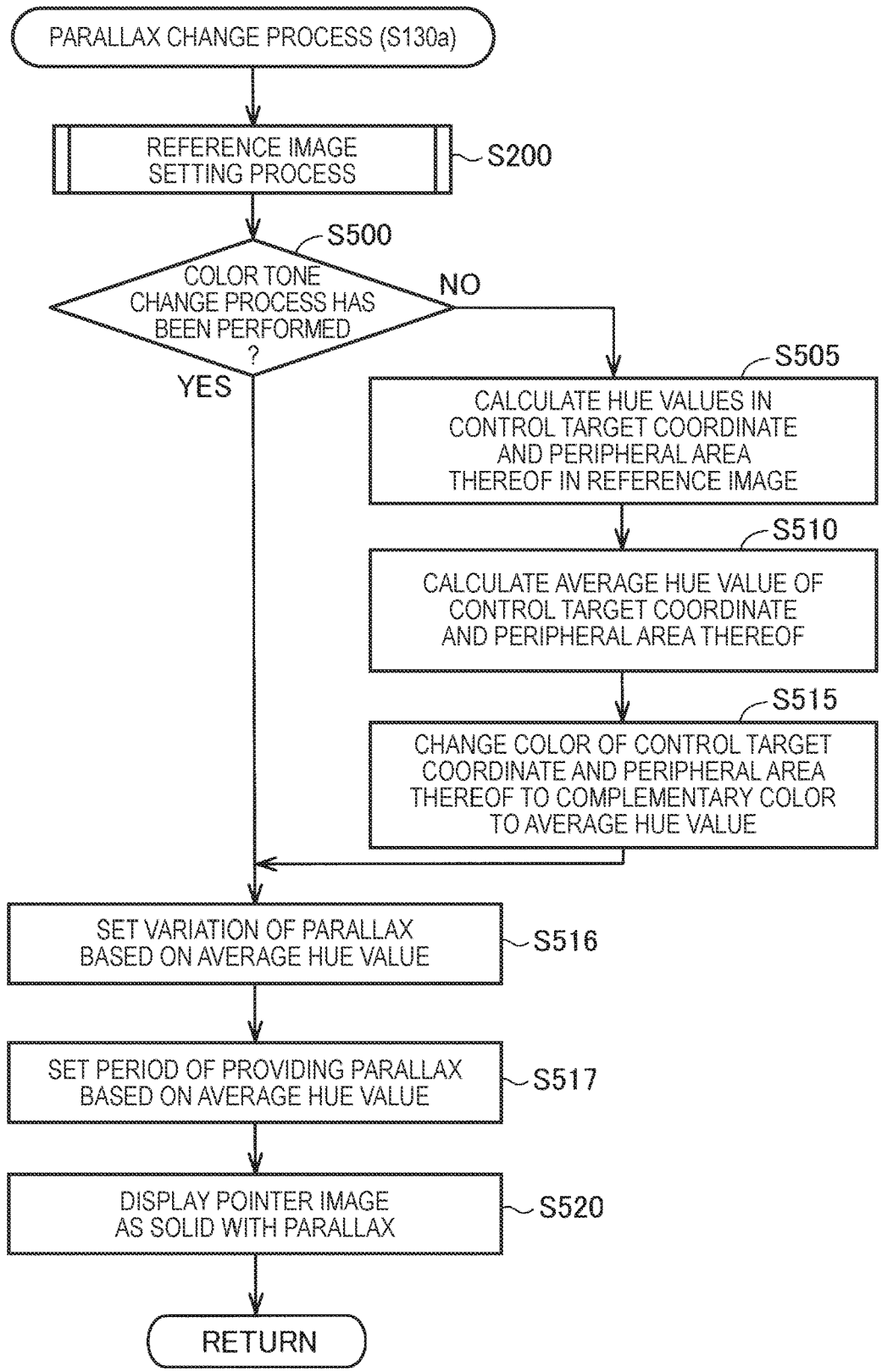
FIG. 16 is a flowchart showing a detailed processing procedure of a parallax change process (step S130a) in a second embodiment of the invention.

FIG. 16 is a flowchart showing a detailed processing procedure of a parallax change process (step S130a) in the second embodiment. The pointer image display control process in the second embodiment is different in procedure of the parallax change process from the parallax change process (step S130) in the first embodiment, and is the same as that of the first embodiment in other processing procedures. The parallax change process (step S130a) of the second embodiment is different from the parallax change process (step S130) of the first embodiment in the point that the step S516 and the step S517 are additionally executed, and in the point that the step S525 is omitted. Since the other procedures in the parallax change process (step S130a) of the second embodiment are the same as those in the parallax change process (step S130) of the first embodiment, the same procedures are denoted by the same reference symbols, and the detailed descriptions thereof will be omitted.

In the parallax change process of the second embodiment, a process of displaying the pointer image Pt as a solid with parallax, and a process of displaying the pointer image Pt as a plane without parallax are alternately switched to display the pointer image Pt. Specifically, as shown in FIG. 16, when the control target coordinate and the peripheral area thereof are set (step S515) to the complementary color to the average hue value, the display control section 147 sets (step S516) the variation of the parallax based on the average hue value. Specifically, the display control section 147 calculates the difference between the average hue value of the pointer image Pt and the average hue value of the overlapping area Ar1, and then sets the variation of the parallax to a relatively small fixed value in the case in which the difference between the average hue values thus calculated is larger than a predetermined threshold value. Further, in the case in which the difference between the average hue values calculated is equal to or lower than a predetermined threshold value, the display control section 147 sets the variation of the parallax to a relatively large fixed value. In the case in which the difference between the average hue value of the pointer image Pt and the average hue value of the overlapping area Ar1 is large, the pointer image Pt is easy to distinguish even if the variation in parallax is small, on the one hand, in the case in which the difference between the average hue value of the pointer image Pt and the average hue value of the overlapping area Ar1 is small, there is a possibility that the pointer image Pt is unable to be distinguished unless the variation of the parallax is increased, on the other hand. Therefore, as described above, the variation of the parallax is set to a relatively small value in the case in which the difference in average hue value calculated is large, and the variation of the parallax is set to a relatively large value in the case in which the difference in average hue value calculated is small.

After executing the step S516, the display control section 147 sets (step S517) the period of providing the parallax based on the average hue value. Specifically, similarly to the step S516 described above, the display control section 147 calculates the difference between the average hue value of the pointer image Pt and the average hue value of the overlapping area Ar1, and then sets the period of the parallax to a relatively short period in the case in which the difference between the average hue values thus calculated is larger than a predetermined threshold value. Further, in the case in which the difference between the average hue values calculated is equal to or lower than a predetermined threshold value, the display control section 147 sets the period of the parallax to a relatively long period.

It should be noted that it is preferable to set the variation of the parallax and the period of the parallax based on 3DC Safety Guidelines (conforming with "ISO IWA3") formulated by 3D Consortium. Specifically, the parallax is preferably set in a range equal to or shorter than the interpupillary distance, and is more preferably set in a range corresponding to 5 cm. Further, the variation of the parallactic angle is preferably set within 2 degrees, and is more preferably set within 1 degree as the comfortable parallax range.

After executing the step S517, the display control section 147 displays the pointer image Pt as a solid with parallax similarly to the step S520 described above. On this occasion, the pointer image Pt is displayed based on the variation and the period of the parallax set in the step S516 and the step S517 described above.

According to the HMD 100 of the second embodiment described hereinabove, since the pointer image Pt is displayed as a solid with parallax, and the variation of the parallax is set based on the average hue value, it is possible to enhance the visibility of the pointer image Pt to improve the followability (performance of following with eyes) to the pointer image Pt in the case in which the pointer image Pt moves to an area different in average hue value.

In addition, since the process of displaying the pointer image Pt as a solid with parallax and the process of displaying the pointer image Pt as a plane without parallax are alternately switched and the period of providing the parallax is set based on the average hue value, it is possible to make the pointer image Pt conspicuous to improve the visibility. Further, even in the case in which the pointer image Pt has moved to the area different in average hue value, by varying the period of providing the parallax, it is possible to make the pointer image Pt conspicuous, and thus the followability to the pointer image Pt can be improved.

C. Third Embodiment

C1. Overall Configuration of Transmissive Display Device

The head-mounted display device 100 in the third embodiment is the same as the head-mounted display device 100 in the first embodiment shown in FIG. 1, and therefore, the detailed description thereof will be omitted.

C2. Pointer Image Display Control Process

Figure 17:
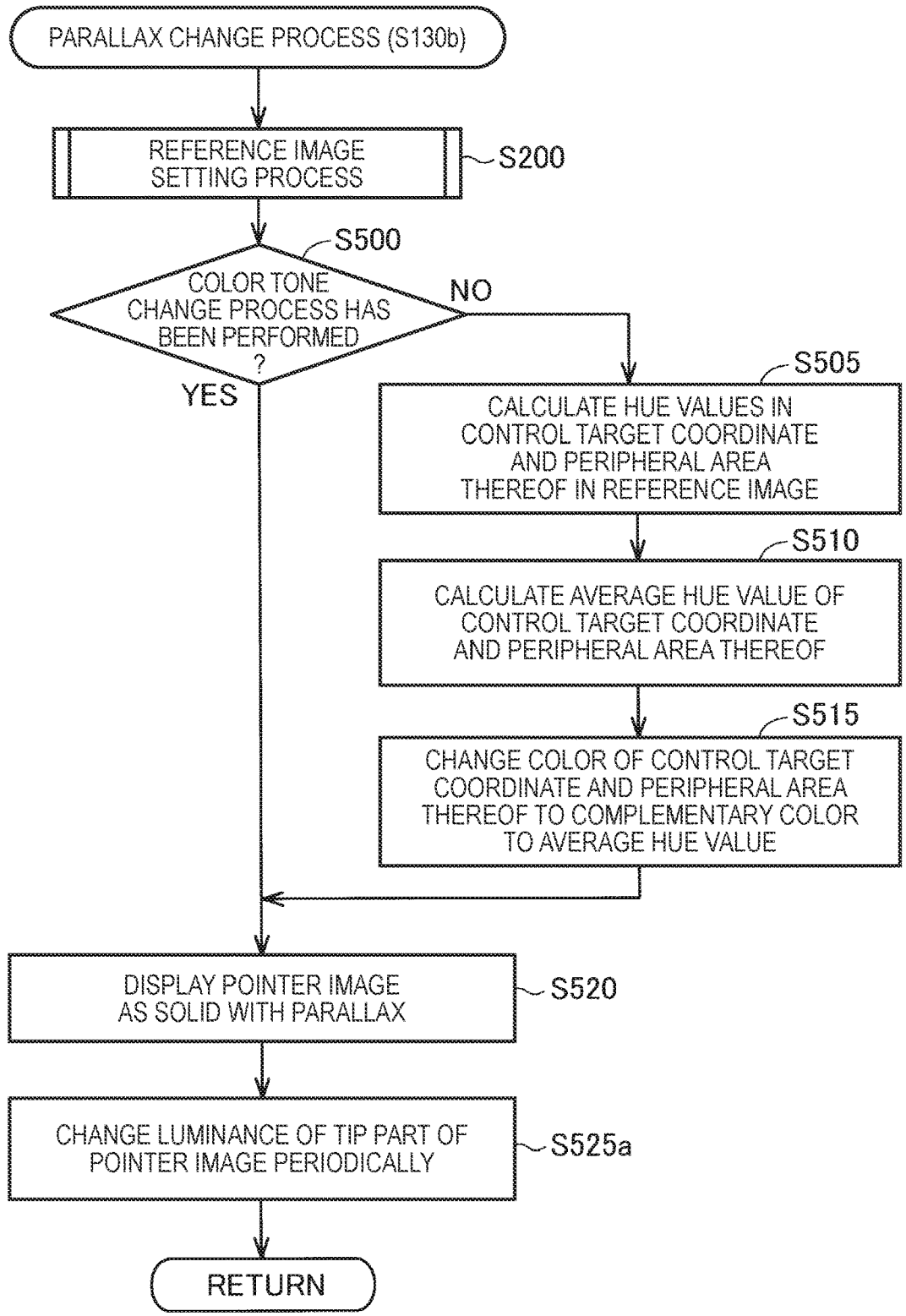
FIG. 17 is a flowchart showing a detailed processing procedure of a parallax change process (step S130b) in a third embodiment of the invention.

FIG. 17 is a flowchart showing a detailed processing procedure of a parallax change process (step S130b) in the third embodiment. The pointer image display control process in the third embodiment is different in procedure of the parallax change process from the parallax change process (step S130) in the first embodiment, and is the same as that of the first embodiment in other processing procedures. The parallax change process (step S130b) of the third embodiment is different from the parallax change process (step S130) of the first embodiment in the point that the step S525a is executed instead of the step S525. Since the other procedures in the parallax change process (step S130b) of the third embodiment are the same as those in the parallax change process (step S130) of the first embodiment, the same procedures are denoted by the same reference symbols, and the detailed descriptions thereof will be omitted.

In the parallax change process of the third embodiment, the pointer image Pt is displayed with the luminance of the tip part varied periodically. Specifically, as shown in FIG. 17, when the pointer image Pt is displayed (step S520) as a solid with parallax, the display control section 147 periodically changes (step S525a) the luminance of the tip part of the pointer image Pt. More specifically, the display control section 147 changes the luminance of the tip part of the pointer image Pt within a predetermined range. Thus, the pointer image Pt is displayed to the user with the tip part thereof blinked.

According to the HMD 100 related to the third embodiment described hereinabove, since the pointer image Pt is displayed with the luminance of at least a part of the pointer image Pt changed periodically, it is possible to display the pointer image Pt with a part of the pointer image Pt blinked, and thus, the visibility of the pointer image Pt can further be improved.

D. Modified Examples

D1. Modified Example 1

In each of the embodiments described above, the reference image is the composite image, but the invention is not limited to this configuration. For example, the reference image can also be the target image AI, or can also be the external world image obtained by imaging. For example, in the case in which the external world luminance is lower than a predetermined threshold value when comparing the external world luminance and the target image luminance with each other (step S305, step S320) in the reference image setting process (step S200) described above, the color and the luminance of the external world is prevented from affecting the pointer image Pt. Therefore, in this case, it is possible to use the target image AI as the reference image. Even in such a configuration, substantially the same advantages as those of the embodiments described above can be exerted.

D2. Modified Example 2

In the direction change process (step S120) in each of the embodiments described above, the direction in which the striped pattern of the pointer image Pt is repeated is the direction perpendicular to the resultant vector of the edge inclinations, but is not limited to the direction perpendicular thereto. For example, the direction can also be a direction crossing the resultant vector of the edge inclinations at an angle different from 90 degrees. Even in such a configuration, substantially the same advantages as those of the embodiments described above can be exerted.

D3. Modified Example 3

In the first embodiment described above, the pointer image Pt is displayed with the pattern set to the striped pattern, but the invention is not limited to this configuration. For example, the pointer image Pt can also be displayed with the pattern set to a gradation pattern.

Figure 18:
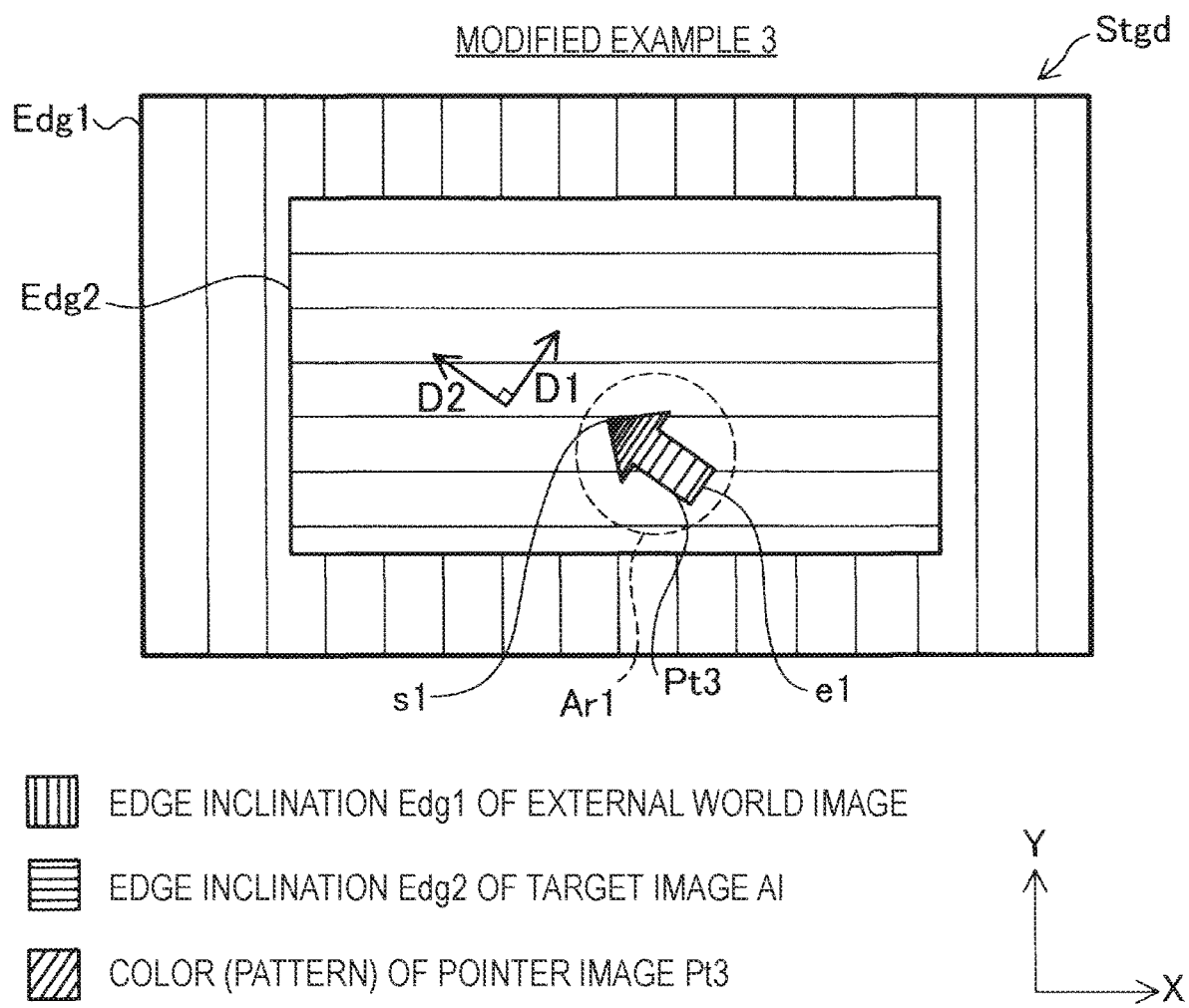
FIG. 18 is an explanatory diagram schematically showing a pattern of the pointer image in Modified Example 3.

FIG. 18 is an explanatory diagram schematically showing the pattern of the pointer image Pt3 in Modified Example 3. The pointer image Pt3 shown in FIG. 18 is different only in the pattern from the pointer image Pt of the first embodiment shown in FIG. 13, and other constituents in FIG. 18 are the same as other constituents in FIG. 13. As shown in FIG. 18, the pointer image Pt3 is displayed so that the color density of the pointer image Pt3 gradually reduces from the tip part s1 toward the back end part e1, namely along a direction D2 perpendicular to the direction D1 of the resultant vector of the edge inclinations. As described above, it is possible to display the pointer image Pt3 so that the color (density) varies in a layered manner along a direction determined based on the edge inclination, namely along the direction D2 perpendicular to the direction D1 of the resultant vector of the edge inclinations. Even in such a configuration, substantially the same advantages as those of the first embodiment described above can be exerted.

D4. Modified Example 4

In the third embodiment described above, the pointer image Pt is displayed with the luminance of the tip part of the pointer image Pt changed periodically, but the part the luminance of which is periodically changed during the display is not limited to the tip part of the pointer image Pt. For example, the part can also be the whole of the pointer image Pt. In other words, in general, any configuration in which the luminance of at least a part of the pointer image Pt is changed periodically exerts substantially the same advantages as those of the third embodiment described above.

D5. Modified Example 5

In each of the embodiments described above, the overlapping area Ar1 is an area including the display position of the pointer image Pt in the reference image, and the area having a roughly circular shape centered on the midpoint of the length in the longitudinal direction of the pointer image Pt, but the invention is not limited to this configuration. For example, the shape of the area is not limited to roughly circular shape, but can also be other arbitrary shapes such as an elliptical shape or a polygon shape. Further, for example, the area can also be an area the outer edge of which is formed of an aggregate of the points distant as much as a predetermined length from the outer edge of the pointer image Pt. Further, for example, the area can also be an area not including the peripheral area of the pointer image Pt. In other words, the area formed along the contour of the pointer image Pt can be defined as the overlapping area. Further, for example, in the case in which the pointer image Pt is superimposed on the image such as an icon, it is also possible to define the area including the image of the icon or the like as the overlapping area. Even in such a configuration, substantially the same advantages as those of the embodiments described above can be exerted.

D6. Modified Example 6

In each of the embodiments described above, the pointer image display control process is started when the power of the HMD 100 is set to the ON state, but the invention is not limited to this configuration. For example, the pointer image display control process can also be triggered by the detection of a predetermined operation in the HMD 100. As the predetermined operation, there can be cited, for example, a tap action on the track pad 14 in the control device 10, and the start up of a predetermined application. Even in such a configuration, substantially the same advantages as those of the embodiments described above can be exerted. In addition, since the control of the display configuration of the pointer image Pt is triggered by the detection of a predetermined operation in the HMD 100, it is possible for the user of the HMD 100 to control the trigger for execution of the control of the display configuration of the pointer image Pt, and thus, the convenience of the user can be enhanced. Further, since it is possible to perform the predetermined operation to improve the visibility of the pointer image Pt only in the case in which it is difficult for the user to visually recognize the pointer image Pt, the processing load of the HMD 100 can be reduced compared to the configuration of always performing the pointer image display control process.

D7. Modified Example 7

In each of the embodiments described above, there are used three modes, namely the color tone change mode, the direction change mode and the parallax change mode, as the usage modes of the pointer image display control process, but the invention is not limited to this configuration. For example, it is also possible to eliminate the color tone change mode, and use two modes, namely the direction change mode and the parallax change mode. Further, for example, it is also possible to use only the color tone change mode. Even in such a configuration, since the pointer image Pt is displayed with the display configuration changed in accordance with the feature quantity of the area including the display position of the pointer image Pt in the reference image, substantially the same advantages as in each of the embodiments described above are exerted.

D8. Modified Example 8

In each of the embodiments described above, the composite image is the composite image of the whole of the external world image and the whole of the target image AI, but the invention is not limited to this configuration. For example, the composite image of the area including the display position of the pointer image Pt in the external world image and the area including the display position of the pointer image Pt in the target image AI can also be adopted. Even in such a configuration, substantially the same advantages as those of the embodiments described above can be exerted. In addition, the processing area can be made narrower, and the processing load of the pointer image display control process can be reduced.

D9. Modified Example 9

In each of the embodiments described above, the composite image is generated using the additive color mixture, but the invention is not limited thereto. For example, the composite image can also be generated using subtractive color mixture. Even in such a configuration, substantially the same advantages as those of the embodiments described above can be exerted.

D10. Modified Example 10

In each of the embodiments described above, the reference image setting process (step S200) is performed in each of the color tone change process, the direction change process, and the parallax change process, but the invention is not limited thereto. For example, in the case of using a plurality of modes as the usage modes, it is also possible to perform the reference image setting process in the display configuration change process to be performed first, and to use the processing result of the reference image setting process performed first in other display configuration change processes to be performed later. Even in such a configuration, substantially the same advantages as those of the embodiments described above can be exerted.

D11. Modified Example 11

In each of the embodiments described above, the display device for performing the pointer image display control process is the HMD 100, but the invention is not limited thereto. For example, the display device can also be a head-up display (HUD), or can also be a video see-through type HMD. Further, a stationary transmissive display device can also be adopted. Even in such a configuration, substantially the same advantages as those of the embodiments described above can be exerted.

D12. Modified Example 12

In each of the embodiments described above, at least a part of the function of the display control section 147 can be performed by another control function section. Specifically, although in each of the embodiments described above, the display control section 147 performs the display of the image using the OLED panels 223, 243, and the pointer image display control process, but the pointer image display control process, for example, can be performed by another control function section. Further, some or all of the functions and the processes of these control function sections can also be realized using a digital circuit such as a CPU, an ASIC (application specific integrated circuit), or an FPGA (field programmable gate array). Even in such a configuration, substantially the same advantages as those of the embodiments described above can be exerted.

D13. Modified Example 13

In the second embodiment described above, the variation of the parallax and the period of the parallax are set to the fixed values respectively in the case in which the difference between the average hue value of the pointer image Pt and the average hue value of the overlapping area Ar1 is larger than a predetermined threshold value, and in the case in which the difference is equal to or smaller than the predetermined threshold value, but the invention is not limited thereto. For example, it is possible for the variation of the parallax and the period of the parallax to be set so as to decrease as the difference in average hue value increases, or so as to increase as the difference in average hue value decreases. Further, for example, it is possible for the variation of the parallax and the period of the parallax to be set so as to be proportional to the difference in average hue value. Even in such a configuration, substantially the same advantages as those of the second embodiment described above can be exerted.

D14. Modified Example 14

In the color tone change process, the direction change process, and the parallax change process in each of the embodiments described above, the display process of the pointer image Pt with the display configuration having been changed is performed, but the invention is not limited thereto. For example, in each of the color tone change process, the direction change process and the parallax change process, after performing the change of the display configuration of the pointer image Pt has been performed, display of the pointer image Pt having been changed is not required to be performed. In this case, it is also possible to display the pointer image Pt after performing the display configuration change process latest out of the display configuration change processes. Specifically, it is possible to perform the display process of the pointer image Pt after executing the step S130 shown in FIG. 8. Even in such a configuration, substantially the same advantages as those of the embodiments described above can be exerted.

D15. Modified Example 15

In the direction change process in each of the embodiments and the modified examples, the pattern of the pointer image Pt is changed, but the invention is not limited thereto. For example, it is also possible to change the shape of the pointer image Pt to a shape based on the direction crossing the resultant vector of the edge inclinations. For example, in the case in which the shape of the pointer image Pt is a roughly circular shape, it is also possible to change the shape of the pointer image Pt to an elliptical shape elongated along a direction crossing the resultant vector of the edge inclinations. Further, for example, it is also possible to change both of the pattern and the shape of the pointer image Pt, or to change the shape of the pointer image Pt alone. Even in such a configuration, substantially the same advantages as those of the embodiments and the modified examples described above can be exerted.

D16. Modified Example 16

In each of the embodiments described above, display of the pointer image Pt with parallax is repeated periodically, but the invention is not limited thereto. For example, it is possible to display the pointer image Pt with parallax just once. Further, for example, it is also possible to display the pointer image Pt with parallax once, and then continue display of the pointer image Pt with parallax without restoring the display configuration of the pointer image Pt. Even in such a configuration, substantially the same advantages as those of the embodiments described above can be exerted.

The invention is not limited to the embodiments and the modified examples described above, but can be implemented with a variety of configurations within the scope or the spirit of the invention. For example, the technical features in each of the embodiments and the modified examples corresponding to the technical features in the aspects described in SUMMARY section can appropriately be replaced or combined in order to solve all or a part of the problems described above, or in order to achieve all or a part of the advantages. Further, the technical feature can arbitrarily be eliminated unless described in the specification as an essential element.

The entire disclosure of Japanese Patent Application No. 2017-055713, filed Mar. 22, 2017 is expressly incorporated by reference herein.

What is claimed is:

1. A transmissive display device comprising:
    a first display section having a light transmissive property, and adapted to display a first pointer image so as to be superimposed on an external world visually recognized through the first display section;
    a second display section having a light transmissive property, and adapted to display a second pointer image so as to be superimposed on the external world visually recognized through the second display section
    a display control section adapted to control a display configuration of the first pointer image and the second pointer image as a parallax image; and
    an imaging section adapted to take a first image of the external world and a second image of the external world by a stereo camera,
    wherein the display control section is configured to, when each of the first image and the second image include an object, a position of the object in the first image is different from a position of the object in the second image, and the first pointer image and the second pointer image overlaps the object in the first image and the object in the second image respectively:
        change at least one of a color of the first pointer image and a pattern of the first pointer image based on a feature quantity of the object in the first image, and
        change at least one of a color of the second pointer image and a pattern of the second pointer image based on a feature quantity of the object in the second image.

2. The transmissive display device according to claim 1, further comprising:
    an average hue value calculation section adapted to calculate an average hue value of an area including a display position of the first pointer image and the second pointer image,
    wherein the display control section displays the first pointer image and the second pointer image with a color of the first pointer image and the second pointer image set to a complementary color to the average hue value.

3. The transmissive display device according to claim 1, further comprising:
    an edge inclination calculation section adapted to calculate an edge inclination of an area including a display position of the first pointer image and the second pointer image,
    wherein the display control section sets a pattern of the first pointer image and of the second pointer image to respective patterns having directionality determined based on the edge inclination, and displays the first pointer image and the second pointer image.

4. The transmissive display device according to claim 3, wherein
    the display control section sets the pattern of the first pointer image and the pattern of the second pointer image to a striped pattern repeated in a direction crossing a resultant vector of the edge inclinations, and displays the first pointer image and the second pointer image.

5. The transmissive display device according to claim 1, further comprising:
    an average hue value calculation section adapted to calculate an average hue value of an area including a display position of the first pointer image and of the second pointer image,
    wherein the display control section displays the first pointer image and the second pointer image as a solid with parallax, and sets a variation of the parallax based on the average hue value.

6. The transmissive display device according to claim 1, wherein
the display control section displays the first pointer image and the second pointer image as a solid with parallax, and alternately performs a process of moving a focal position of the first pointer image and the second pointer image displayed as the solid as much as a predetermined length in a direction from the respective first display section and the second display section toward the external world, and a process of moving the focal position of the first pointer image and the second pointer image as much as a predetermined length in a direction from the external world toward the respective first display section and second display section.

7. The transmissive display device according to claim 1, wherein
the display control section displays the first pointer image and the second pointer image with luminance of at least a part of the pointer image changed periodically.

8. A display control method comprising:
displaying, using a first display section having a light transmissive property, a first pointer image so as to be superimposed on an external world visually recognized through the first display section;
displaying, using a second display section having a light transmissive property, a second pointer image so as to be superimposed on the external world visually recognized through the second display section;
controlling a display configuration of the first pointer image and the second pointer image as a parallax image;
taking a first image of the external world and a second image of the external world by a stereo camera;
changing, when each of the first image and the second image include an object, a position of the object in the first image is different from a position of the object in the second image, and the first pointer image and the second pointer image overlaps the object in the first image and the object in the second image respectively, at least one of a color of the first pointer image and a pattern of the first pointer image based on a feature quantity of the object in the first image; and
changing, when each of the first image and the second image include an object, a position of the object in the first image is different from a position of the object in the second image, and the first pointer image and the second pointer image overlaps the object in the first image and the object in the second image respectively, at least one of a color of the second pointer image and a pattern of the second pointer image based on a feature quantity of the object in the second image.

9. A non-transitory, computer readable medium storing a computer program, the computer program making a computer realize functions comprising:
displaying, using a first display section having a light transmissive property, a first pointer image so as to be superimposed on an external world visually recognized through the first display section;
displaying, using a second display section having a light transmissive property, a second pointer image so as to be superimposed on the external world visually recognized through the second display section;
controlling a display configuration of the first pointer image and the second pointer image as a parallax image;
taking a first image of the external world and a second image of the external world by a stereo camera;
changing, when each of the first image and the second image include an object, a position of the object in the first image is different from a position of the object in the second image, and the first pointer image and the second pointer image overlaps the object in the first image and the object in the second image respectively, at least one of a color of the first pointer image and a pattern of the first pointer image based on a feature quantity of the object in the first image; and
changing, when each of the first image and the second image include an object, a position of the object in the first image is different from a position of the object in the second image, and the first pointer image and the second pointer image overlaps the object in the first image and the object in the second image respectively at least one of a color of the second pointer image and a pattern of the second pointer image based on a feature quantity of the object in the second image.

* * * * *